United States Patent
Dharamshi et al.

(10) Patent No.: US 12,086,154 B1
(45) Date of Patent: Sep. 10, 2024

(54) COLUMNAR CACHE IN HYBRID TRANSACTIONAL/ANALYTICAL PROCESSING (HTAP) WORKLOADS

(71) Applicant: Snowflake Inc., Bozeman, MT (US)

(72) Inventors: Mihir Dharamshi, Redmond, WA (US); Cristian Diaconu, Kirkland, WA (US); Chen Luo, San Mateo, CA (US); Andrew McCormick, San Francisco, CA (US); Corbin McElhanney, San Mateo, CA (US); Joshua Slocum, Austin, TX (US); Wumengjian Zhu, Cupertino, CA (US)

(73) Assignee: Snowflake Inc., Bozeman, MT (US)

( * ) Notice: Subject to any disclaimer, the term of this patent is extended or adjusted under 35 U.S.C. 154(b) by 0 days.

(21) Appl. No.: 18/455,229

(22) Filed: Aug. 24, 2023

(51) Int. Cl.
*G06F 16/25* (2019.01)
*G06F 16/11* (2019.01)
*G06F 16/172* (2019.01)
*G06F 16/23* (2019.01)

(52) U.S. Cl.
CPC .......... *G06F 16/254* (2019.01); *G06F 16/116* (2019.01); *G06F 16/172* (2019.01); *G06F 16/2379* (2019.01)

(58) Field of Classification Search
CPC .... G06F 16/254; G06F 16/116; G06F 16/172; G06F 16/2379
See application file for complete search history.

(56) References Cited

U.S. PATENT DOCUMENTS

| | | | |
|---|---|---|---|
| 2009/0187610 A1* | 7/2009 | Guo .................... | G06F 16/219 707/999.203 |
| 2013/0018903 A1* | 1/2013 | Taranov ............... | G06F 16/211 707/812 |
| 2015/0350316 A1* | 12/2015 | Calder ................. | G06F 11/1076 714/48 |
| 2022/0318223 A1* | 10/2022 | Ahluwalia ........... | G06F 16/2219 |
| 2022/0382758 A1* | 12/2022 | Schreter .............. | G06F 16/2282 |
| 2023/0141902 A1* | 5/2023 | Ma ...................... | G06F 16/24552 707/718 |
| 2023/0336592 A1* | 10/2023 | Narayanaswamy ......... | H04L 63/0263 |

\* cited by examiner

*Primary Examiner* — Robert W Beausoliel, Jr.
*Assistant Examiner* — Mohammad S Bhuyan
(74) *Attorney, Agent, or Firm* — Schwegman Lundberg & Woessner, P.A.

(57) ABSTRACT

The subject technology receives a query, the query including a query range for processing the query. The subject technology sends a request to a key-value store for blob metadata and a set of recent writes for the query range. The subject technology receives the blob metadata, the blob metadata including information related to a set of blob files. The subject technology determines whether the set of blob files is stored in a local cache. The subject technology, in response to at least one blob file being missing from the set of blob files, sends a request to a blob store to retrieve the at least one blob file of the set of blob files. The subject technology transforms the retrieved at least one blob file to a column file format. The subject technology stores the transformed at least one blob file in the local cache.

20 Claims, 16 Drawing Sheets

COLUMNAR CACHE IN HYBRID TRANSACTIONAL/ANALYTICAL PROCESSING (HTAP) WORKLOADS

TECHNICAL FIELD

Embodiments of the disclosure relate generally to a network-based database system or a cloud data platform and, more specifically, to processing database operations and more specifically to performing database processing of large database requests.

BACKGROUND

Cloud-based data warehouses and other database systems and platforms sometimes provide support for transactional processing that enable such systems to perform operations that are not available through the built-in, system-defined functions. However, transactional processing of the data can rapidly grow, and it can be difficult to compact the data in a secure manner that does not affect accuracy or integrity of the data.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
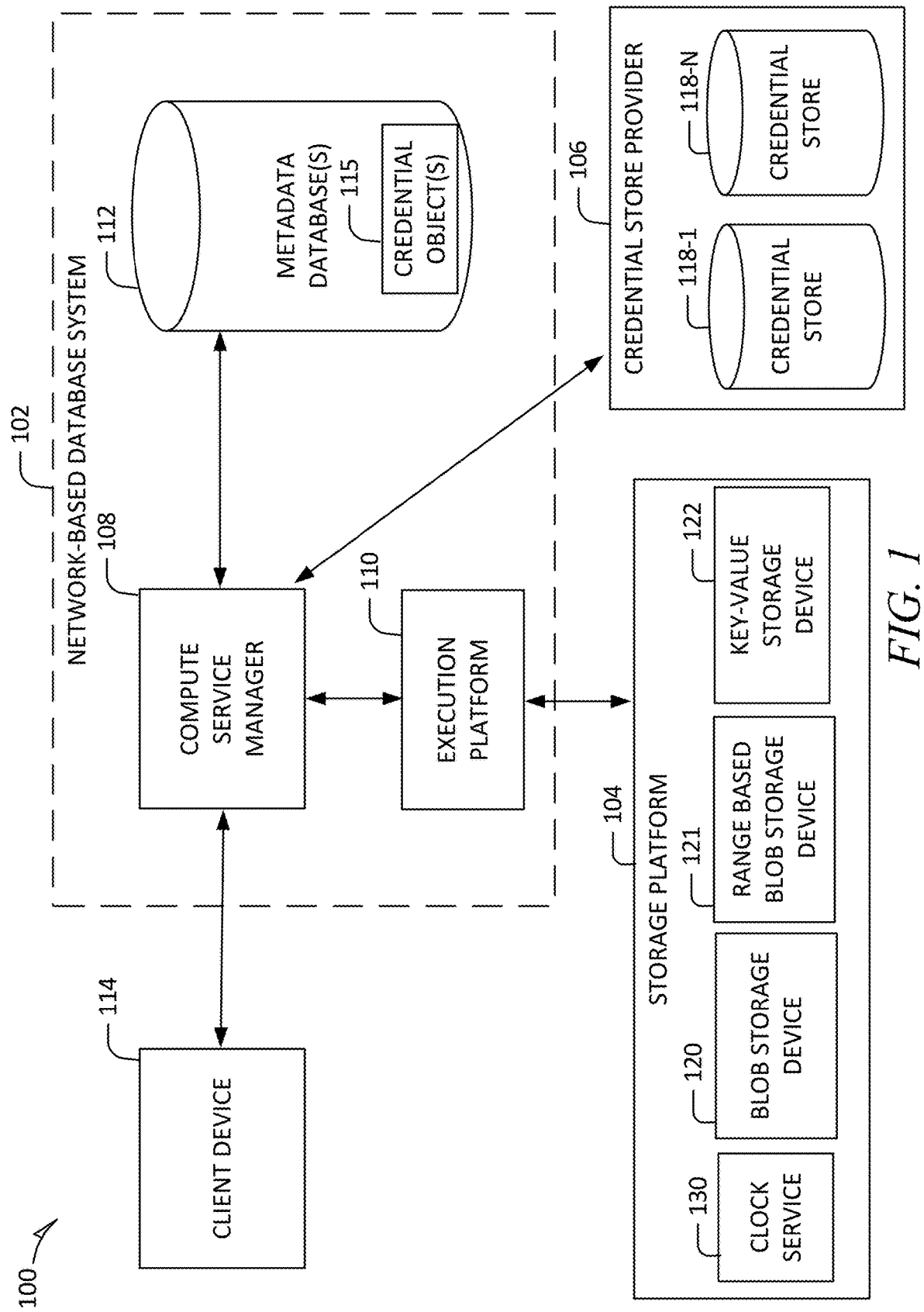
FIG. 1 illustrates an example computing environment that includes a network-based database system in communication with a cloud storage platform, in accordance with some embodiments of the present disclosure.

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

In database systems, performing transactions on a given database can be supported. To facilitate that a given transaction is committed to a table, existing database systems can employ varying approaches including Online Transactional Processing (OLTP) techniques. As discussed herein, OLTP refers to a category of data processing that involves transaction-oriented tasks. In an example, OLTP involves inserting, updating, and/or deleting varying amounts of data in a given database. OLTP can deal with large numbers of transactions by a large number of users. In some example embodiments, an OLTP database can be implemented as a key-value database in which the data is managed as key-value pairs (e.g., FoundationDB). Increasingly, such transactions are implemented by users that are working in a distributed and networked environment from varying locations and computing environments. Thus, it is also increasingly important to ensure such transactions execute and complete in a concurrent manner that protects the integrity and consistency of the data in such a distributed environment.

As described herein, a database system provides concurrency control and isolation for executing a series of query statements (e.g., Structured Query Language (SQL) statements) within a transaction against a linearizable storage. In particular, the database system herein employs a concurrency control mechanism that is a combination of a multi-version concurrency control for read operations (MVCC) and locking for write operations. Additionally, the database system implements a targeted isolation level (e.g., snapshot isolation), where each statement can execute against a different snapshot of a database, and write locks are held until a transaction commit.

The database system, in an embodiment, implements a two-level transaction hierarchy, where a top-level transaction corresponds to a SQL transaction, and a nested transaction corresponds to a SQL statement within the parent SQL transaction. A given nested transaction can perform read and write operations, and can perform a rollback and restart execution zero or more times before succeeding.

Upon transaction commit, write operations can become visible, and write locks held by each contained statement can be released.

Further, embodiments of the database system address deadlock detection and resolution for databases. Advantageously, the database system avoids false positives where only transactions involved in a deadlock will be aborted. This is helpful for users to find deadlocks in their application code so that deadlocks can be fixed. In addition, the database system implements embodiments of distributed deadlock detection without a centralized transaction manager. In an example, this is desirable for distributed databases, where each transaction is executed by a separate job, so that the coordination among different jobs/nodes are minimized.

The online analytical processing database (OLAP) is a data structure or data warehouse configured for a relatively small number of complex transactions. OLAP queries are often complex and involve aggregations. For OLAP database systems, the emphasis can be the response time as an effectiveness measure for completing the complex queries. In some example embodiments, OLAP data is stored in object storage (e.g., blob storage). The OLAP database can be configured as a multidimensional database that has one or more hierarchies or formula-based relationships of data within each dimension. Aggregation or consolidation of data in the OLAP database involves computing all of these data relationships for one or more dimensions.

In some example embodiments, a database user can issue a large analytical read request (e.g., an OLAP-style query), against an OLTP database. For example, a user of a OLTP database most often performs point lookups against the OLTP database or other types of singular transactions, however the user may seek to perform a analytic-style query from time to time. Due to the configuration of OLTP databases, a large read can significantly degrade performance of the OLTP database and in some cases, a large read can often knock the OLTP database off-line.

To address the foregoing, in some example embodiments, a hybrid system 230 implements a blob manager system and one or more blob worker systems to convert key-value data into blob data, which can provide an efficient response to a large analytical-style read request when the requests are received. In some example embodiments, the blob manager is configured to split the key-value data (e.g. OLTP data, Foundation DB data) into range granules, or chunks of data that cover data ranges (e.g., 10 MB chunk for records from A to B, another 10 MB chunk for records from C to F, and so on).

In some example embodiments, the blob workers are configured to replicate the chunks from key-value store to blob storage (e.g., S3). In some example embodiments, the blob workers replicate the chunks as two types of files, including (1) a snapshot file, and (2) a delta file. The snapshot file comprises all key-value pairs of a specific key-value storage device version (e.g., FoundationDB version, at a certain time). The delta files cover a range of time, and specify what changes occurred during the range of time, where each change has a time stamp. In some example embodiments, the delta files are streamed from the OLTP servers via change feeds and buffered in memory. For example, a blob worker may write a delta file to blob storage after accumulating a set amount of buffered mutations for a given range granules (e.g., accumulate 500 KB mutations). The snapshots and the deltas can function together to enable reconstruction of the chunk, as in a Log Structure Merge (LSM) tree.

In some example embodiments, when an analytical-style read (e.g., large read) request is received from a client (e.g., from execution nodes of a client database account), the hybrid system 230 activates the blob manager and blob workers to generate a list of pointers of what files need to be retrieved using the snapshot and delta files. That is, instead of reading the rows directly, the pointer data (e.g., snapshot file, deltas) is sent to the client (e.g., to the clients execution nodes) and the client-side performs the actual processing of the read request to reconstruct the requested rows using a plurality of nodes to greatly speed up response performance. Additionally, to obtain faster performance, the client can activate more execution nodes.

In some example embodiments, the hybrid system 230 is configured to receive a given read request and determine whether the read request should be performed directly on the key-value data store (e.g., the OLTP database) or should be handled by the blob manager and blob workers. As an example, if the read is small (e.g., point reads of OLTP data, reads smaller than a preconfigured size), the hybrid system 230 then performs the read directly on the key-value data store (e.g., Foundation Database). Alternatively, if the read is large then the hybrid system 230 activates the blob manager and blob workers to manage the read via sending the pointer data that comprises the snapshots and deltas to the client so that the data for the read can be retrieved from blob storage and processed using the clients execution nodes. Although large reads are discussed here as an example as a read type that triggers the blob system, in some example embodiments, any complex read request can trigger the blob system. Examples of complex read requests include: analytical style reads (e.g., OLAP style reads, requiring multiple dimensions of data for computation of the result, aggregations of data in different columns), reads that involve more than a preconfigured size of data (e.g., data size limits, such as more than 10 MB, more than 10 GB), reads that involve more than a preconfigured number of data units (e.g., data unit size limit, such as reading all rows (row units) of a large table, reading more than a pre-configured limit of rows, reading from more than a preconfigured set limit of different tables (table unit limit), reading more than a set number of columns (column unit limit) reading from more than a preconfigured limit of storage buckets or blobs (object store limit), and combinations thereof, such as: the limit is exceeded if it is a read on more than 10 GB of data or a read of an entire table or is a read of more than a pre-set maximum of rows). Additionally, the hybrid system 230 can be re-configured with different types of new reads that encounter problems on the OLTP data. For example, if a user issues a new type of read request against the OLTP data (e.g., read having a unique complex join or data aggregation) that is not deemed as a complex read request, but nevertheless causes issue on the OLTP system, then the hybrid system 230 is updated to store and identify the given new type of read request and deem it as a complex read which initiates the blob system, in accordance with some example embodiments. In this way, large reads can be handled by a OLTP database as fast as they can be handled using a OLAP database. Additionally, due to the structure of the pointer data that is passed to the client, it is not more computationally expensive to run large reads against older archived data.

FIG. 1 illustrates an example computing environment 100 that includes a database system in the example form of a network-based database system 102, in accordance with some embodiments of the present disclosure. To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the computing environment 100 to facilitate additional functionality that is not specifically described herein. In other embodiments, the computing environment may comprise another type of network-based database system or a cloud data platform.

As shown, the computing environment 100 comprises the network-based database system 102 in communication with a cloud storage platform 104 (e.g., AWS® S3, Microsoft Azure Blob Storage®, or Google Cloud Storage), and a credential store provider 106. The network-based database system 102 is a network-based system used for reporting and analysis of integrated data from one or more disparate sources including one or more storage locations within the cloud storage platform 104. The cloud storage platform 104 comprises a plurality of computing machines and provides on-demand computer system resources such as data storage and computing power to the network-based database system 102.

The network-based database system 102 comprises a compute service manager 108, an execution platform 110, and one or more metadata databases 112. The network-based database system 102 hosts and provides data reporting and analysis services to multiple client accounts.

The compute service manager 108 coordinates and manages operations of the network-based database system 102. The compute service manager 108 also performs query optimization and compilation as well as managing clusters of computing services that provide compute resources (also referred to as "virtual warehouses", or "virtual databases" that can provide OLAP or OLTP database processing). The compute service manager 108 can support any number of client accounts such as end users providing data storage and retrieval requests, system administrators managing the systems and methods described herein, and other components/devices that interact with compute service manager 108.

The compute service manager 108 is also in communication with a client device 114. The client device 114 corresponds to a user of one of the multiple client accounts supported by the network-based database system 102. A user may utilize the client device 114 to submit data storage, retrieval, and analysis requests to the compute service manager 108.

The compute service manager 108 is also coupled to one or more metadata databases 112 that store metadata pertaining to various functions and aspects associated with the network-based database system 102 and its users. For example, a metadata database 112 may include a summary of data stored in remote data storage systems as well as data available from a local cache. Additionally, a metadata database 112 may include information regarding how data is organized in remote data storage systems (e.g., the cloud storage platform 104) and the local caches. Information stored by a metadata database 112 allows systems and services to determine whether a piece of data needs to be accessed without loading or accessing the actual data from a storage device.

As another example, a metadata database 112 can store one or more credential objects 115. In general, a credential object 115 indicates one or more security credentials to be retrieved from a remote credential store. For example, the credential store provider 106 maintains multiple remote credential stores 118-1 to 118-N. Each of the remote credential stores 118-1 to 118-N may be associated with a user account and may be used to store security credentials associated with the user account. A credential object 115 can indicate one of more security credentials to be retrieved by the compute service manager 108 from one of the remote credential stores 118-1 to 118-N (e.g., for use in accessing data stored by the storage platform 104).

The compute service manager 108 is further coupled to the execution platform 110, which provides multiple computing resources that execute various data storage and data retrieval tasks. The execution platform 110 is coupled to storage platform 104 of the cloud storage platform 104. The storage platform 104 comprises multiple data storage devices, including, for example, blob storage device 120 (e.g., storing data in a micro-partition format of an OLAP database), range-based blob storage device 121 (e.g., storing blob of data, each blob corresponding to a range granule), and key-value storage device 122 (e.g., storing key-value pair data of a OLTP database). In some example embodiments, key-value data (e.g., OLTP data) is replicated from the key-value storage device 122 to the blob storage device 120, as discussed in application Ser. No. 17/249,598, titled "Aggregate and Transactional Networked Database Query Processing," filed on Dec. 14, 2020, which is hereby incorporated in its entirety. In some embodiments, the data storage devices of the storage platform 104 are cloud-based storage devices located in one or more geographic locations. For example, the data storage devices may be part of a public cloud infrastructure or a private cloud infrastructure. The data storage devices may be hard disk drives (HDDs), solid state drives (SSDs), storage clusters, Amazon S3™ storage systems, key-value storage devices (e.g., Foundation Database), or any other data storage technology. Additionally, the cloud storage platform 104 may include distributed file systems (such as Hadoop Distributed File Systems (HDFS)), object storage systems, and the like.

As further shown, the storage platform 104 includes clock service 130 which can be contacted to fetch a number that will be greater than any number previously returned, such as one that correlates to the current time. Clock service 130 is discussed further herein below with respect to embodiments of the subject system.

The execution platform 110 comprises a plurality of compute nodes. A set of processes on a compute node executes a query plan compiled by the compute service manager 108. The set of processes can include: a first process to execute the query plan; a second process to monitor and delete cache files (e.g., micro-partitions) using a least recently used (LRU) policy and implement an out of memory (OOM) error mitigation process; a third process that extracts health information from process logs and status to send back to the compute service manager 108; a fourth process to establish communication with the compute service manager 108 after a system boot; and a fifth process to handle all communication with a compute cluster for a given job provided by the compute service manager 108 and to communicate information back to the compute service manager 108 and other compute nodes of the execution platform 110.

In some embodiments, communication links between elements of the computing environment 100 are implemented via one or more data communication networks. These data communication networks may utilize any communication protocol and any type of communication medium. In some embodiments, the data communication networks are a combination of two or more data communication networks (or sub-Networks) coupled to one another.

In alternative embodiments, these communication links are implemented using any type of communication medium and any communication protocol.

The compute service manager 108, metadata database(s) 112, execution platform 110, and storage platform 104, are shown in FIG. 1 as individual discrete components. However, each of the compute service manager 108, metadata database(s) 112, execution platform 110, and storage platform 104 may be implemented as a distributed system (e.g., distributed across multiple systems/platforms at multiple geographic locations). Additionally, each of the compute service manager 108, metadata database(s) 112, execution platform 110, and storage platform 104 can be scaled up or down (independently of one another) depending on changes to the requests received and the changing needs of the network-based database system 102. Thus, in the described embodiments, the network-based database system 102 is dynamic and supports regular changes to meet the current data processing needs.

During typical operation, the network-based database system 102 processes multiple jobs determined by the compute service manager 108. These jobs are scheduled and managed by the compute service manager 108 to determine when and how to execute the job. For example, the compute service manager 108 may divide the job into multiple discrete tasks (or transactions as discussed further herein) and may determine what data is needed to execute each of the multiple discrete tasks. The compute service manager 108 may assign each of the multiple discrete tasks to one or more nodes of the execution platform 110 to process the task. The compute service manager 108 may determine what data is needed to process a task and further determine which nodes within the execution platform 110 are best suited to process the task. Some nodes may have already cached the data needed to process the task and, therefore, be a good candidate for processing the task. Metadata stored in a metadata database 112 assists the compute service manager 108 in determining which nodes in the execution platform 110 have already cached at least a portion of the data needed to process the task. One or more nodes in the execution platform 110 process the task using data cached by the nodes and, if necessary, data retrieved from the cloud storage platform 104. It is desirable to retrieve as much data as possible from caches within the execution platform 110 because the retrieval speed is typically much faster than retrieving data from the cloud storage platform 104.

As shown in FIG. 1, the computing environment 100 separates the execution platform 110 from the storage platform 104. In this arrangement, the processing resources and cache resources in the execution platform 110 operate independently of the data storage devices in the cloud storage platform 104 (e.g., independently of blob storage device 120). Thus, the computing resources and cache resources are not restricted to specific data storage devices. Instead, all computing resources and all cache resources may retrieve data from, and store data to, any of the data storage resources in the cloud storage platform 104.

Figure 2:
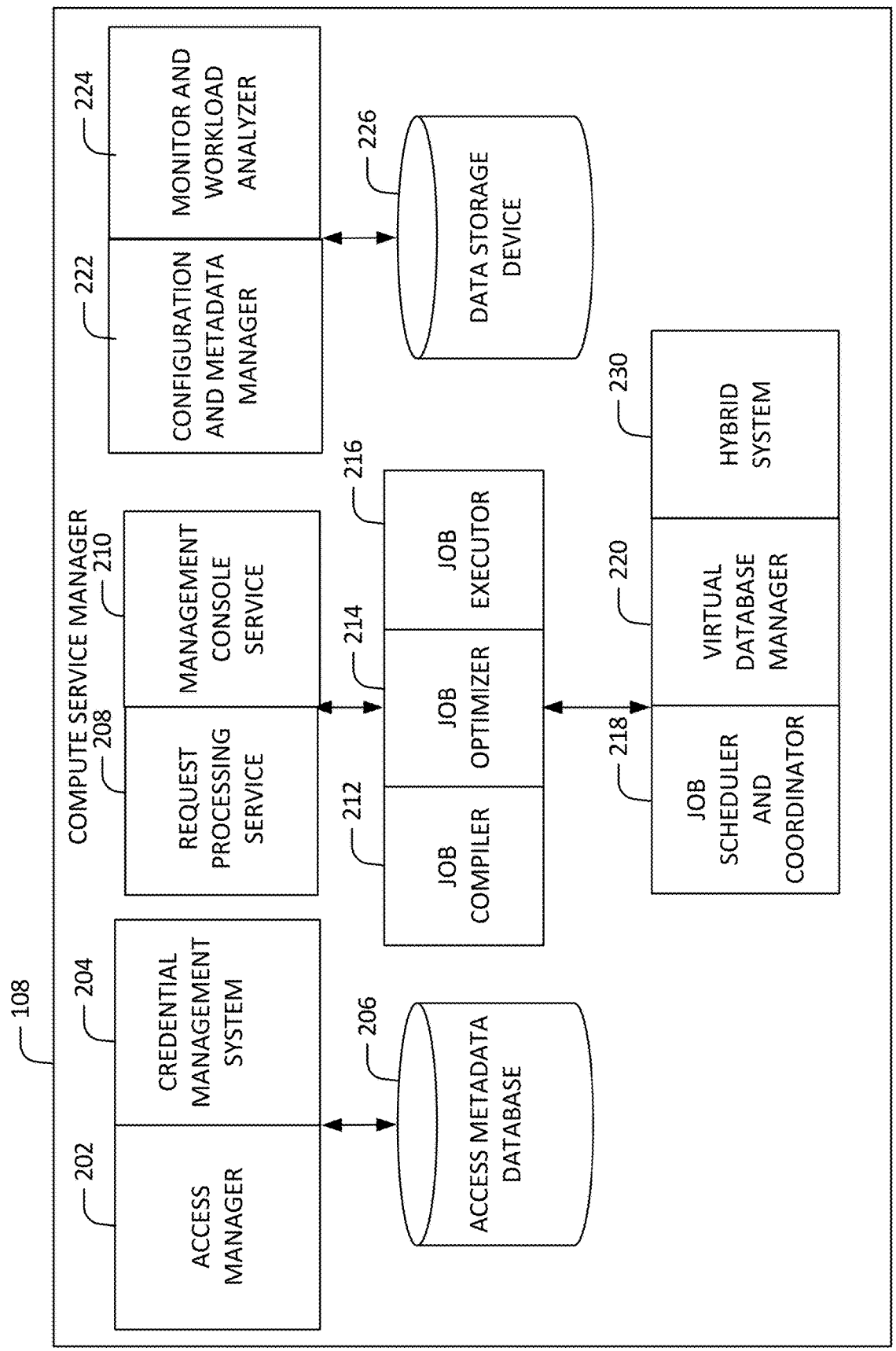
FIG. 2 is a block diagram illustrating components of a compute service manager, in accordance with some embodiments of the present disclosure.

FIG. 2 is a block diagram illustrating components of the compute service manager 108, in accordance with some embodiments of the present disclosure. As shown in FIG. 2, the compute service manager 108 includes an access manager 202 and a credential management system 204 coupled to an access metadata database 206, which is an example of the metadata database(s) 112. Access manager 202 handles authentication and authorization tasks for the systems described herein. The credential management system 204 facilitates use of remote stored credentials (e.g., credentials stored in one of the remote credential stores 118-1 to 118-N) to access external resources such as data resources in a remote storage device. As used herein, the remote storage devices may also be referred to as "persistent storage devices" or "shared storage devices." For example, the credential management system 204 may create and maintain remote credential store definitions and credential objects (e.g., in the access metadata database 206). A remote credential store definition identifies a remote credential store (e.g., one or more of the remote credential stores 118-1 to 118-N) and includes access information to access security credentials from the remote credential store. A credential object identifies one or more security credentials using non-sensitive information (e.g., text strings) that are to be retrieved from a remote credential store for use in accessing an external resource. When a request invoking an external resource is received at run time, the credential management system 204 and access manager 202 use information stored in the access metadata database 206 (e.g., a credential object and a credential store definition) to retrieve security credentials used to access the external resource from a remote credential store.

A request processing service 208 manages received data storage requests and data retrieval requests (e.g., jobs to be performed on database data). For example, the request processing service 208 may determine the data to process a received query (e.g., a data storage request or data retrieval request). The data may be stored in a cache within the execution platform 110 or in a data storage device in storage platform 104.

A management console service 210 supports access to various systems and processes by administrators and other system managers. Additionally, the management console service 210 may receive a request to execute a job and monitor the workload on the system.

The compute service manager 108 also includes a job compiler 212, a job optimizer 214 and a job executor 216. The job compiler 212 parses a job into multiple discrete tasks and generates the execution code for each of the multiple discrete tasks. The job optimizer 214 determines the best method to execute the multiple discrete tasks based on the data that needs to be processed. The job optimizer 214 also handles various data pruning operations and other data optimization techniques to improve the speed and efficiency of executing the job. The job executor 216 executes the execution code for jobs received from a queue or determined by the compute service manager 108.

A job scheduler and coordinator 218 sends received jobs to the appropriate services or systems for compilation, optimization, and dispatch to the execution platform 110. For example, jobs may be prioritized and then processed in that prioritized order. In an embodiment, the job scheduler and coordinator 218 determines a priority for internal jobs that are scheduled by the compute service manager 108 with other "outside" jobs such as user queries that may be scheduled by other systems in the database (e.g., the storage platform 104) but may utilize the same processing resources in the execution platform 110. In some embodiments, the job scheduler and coordinator 218 identifies or assigns particular nodes in the execution platform 110 to process particular tasks. A virtual database manager 220 manages the operation of multiple virtual databases implemented in the execution platform 110. For example, the virtual database manager 220 may generate query plans for executing received queries.

Additionally, the compute service manager 108 includes a configuration and metadata manager 222, which manages the information related to the data stored in the remote data storage devices and in the local buffers (e.g., the buffers in execution platform 110). The configuration and metadata manager 222 uses metadata to determine which data files, micro-partition files, need to be accessed to retrieve data for processing a particular task or job. Further details of micro-partitions is discussed in U.S. Pat. No. 10,817,540, which is hereby incorporated in its entirely. A monitor and workload analyzer 224 oversee processes performed by the compute service manager 108 and manages the distribution of tasks (e.g., workload) across the virtual databases and execution nodes in the execution platform 110. The monitor and workload analyzer 224 also redistributes tasks, as needed, based on changing workloads throughout the network-based database system 102 and may further redistribute tasks based on a user (e.g., "external") query workload that may also be processed by the execution platform 110. The configuration and metadata manager 222 and the monitor and workload analyzer 224 are coupled to a data storage device 226. Data storage device 226 in FIG. 2 represents any data storage device within the network-based database system 102. For example, data storage device 226 may represent buffers in execution platform 110, storage devices in storage platform 104, or any other storage device.

As described in embodiments herein, the compute service manager 108 validates all communication from an execution platform (e.g., the execution platform 110) to validate that the content and context of that communication are consistent with the task(s) known to be assigned to the execution platform. For example, an instance of the execution platform executing a query A should not be allowed to request access to data-source D (e.g., data storage device 226) that is not relevant to query A. Similarly, a given execution node (e.g., execution node 302-1 may need to communicate with another execution node (e.g., execution node 302-2), and should be disallowed from communicating with a third execution node (e.g., execution node 312-1) and any such illicit communication can be recorded (e.g., in a log or other location). Also, the information stored on a given execution node is restricted to data relevant to the current query and any other data is unusable, rendered so by destruction or encryption where the key is unavailable.

Figure 3:
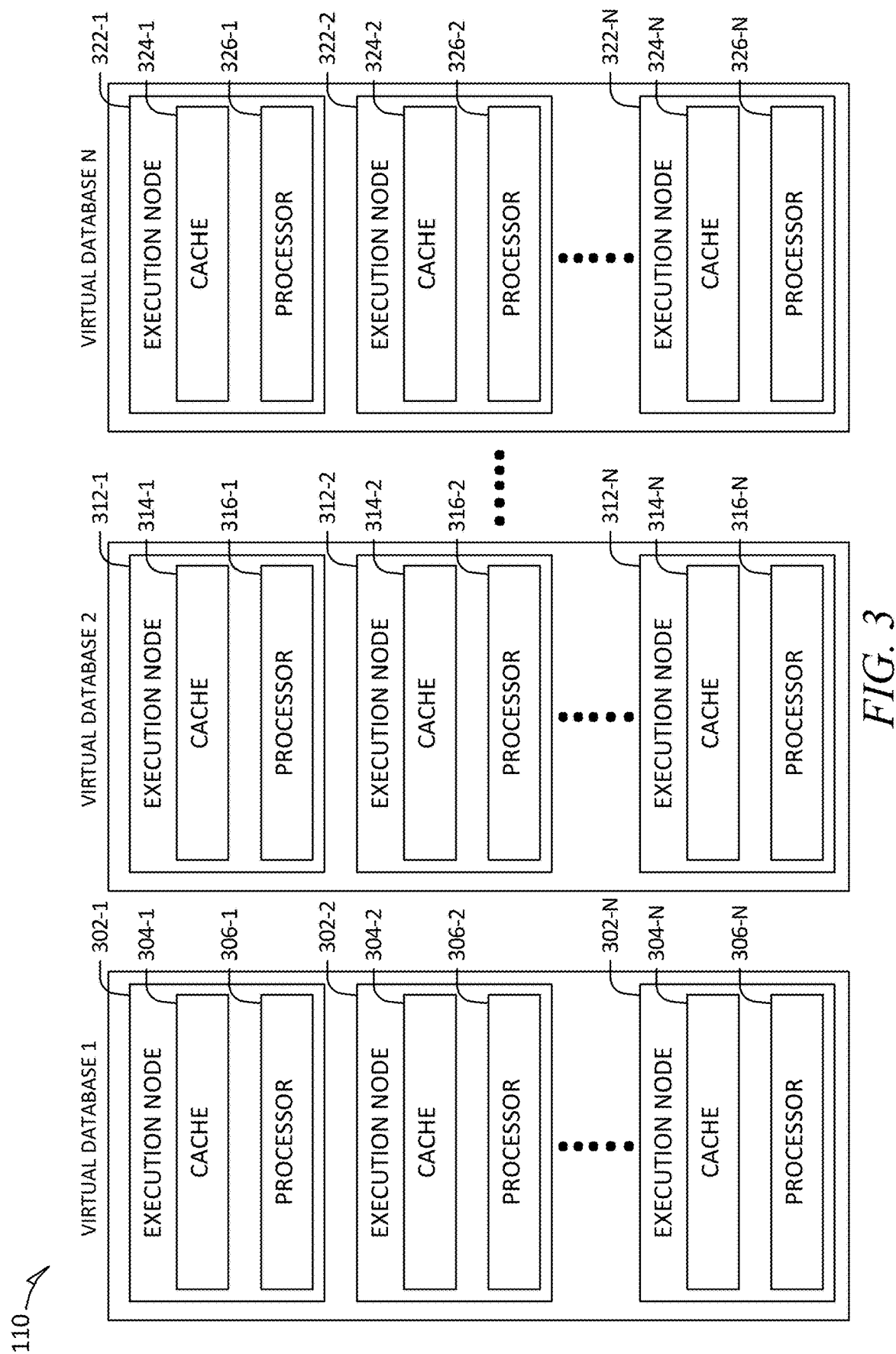
FIG. 3 is a block diagram illustrating components of an execution platform, in accordance with some embodiments of the present disclosure.

FIG. 3 is a block diagram illustrating components of the execution platform 110, in accordance with some embodiments of the present disclosure. As shown in FIG. 3, the execution platform 110 includes multiple virtual database, including virtual database 1, virtual database 2, and virtual database n. Each virtual database includes multiple execution nodes that each include a data cache and a processor. The virtual database can execute multiple tasks in parallel by using the multiple execution nodes. As discussed herein, the execution platform 110 can add new virtual database and drop existing virtual database in real-time based on the current processing needs of the systems and users. This flexibility allows the execution platform 110 to quickly deploy large amounts of computing resources when needed without being forced to continue paying for those computing resources when they are no longer needed. All virtual databases can access data from any data storage device (e.g., any storage device in cloud storage platform 104).

Although each virtual database shown in FIG. 3 includes three execution nodes, a particular virtual database may include any number of execution nodes. Further, the number of execution nodes in a virtual warehouse is dynamic, such that new execution nodes are created when additional demand is present, and existing execution nodes are deleted when they are no longer necessary.

Each virtual database is capable of accessing any of the data storage devices of the storage platform 104, shown in FIG. 1. Thus, the virtual databases are not necessarily assigned to a specific data storage device and, instead, can access data from any of the data storage devices within the cloud storage platform 104. Similarly, each of the execution nodes shown in FIG. 3 can access data from any of the data storage devices in the storage platform 104. In some embodiments, a particular virtual database or a particular execution node may be temporarily assigned to a specific data storage device, but the virtual database or execution node may later access data from any other data storage device.

In the example of FIG. 3, virtual database 1 includes three execution nodes 302-1, 302-2, and 302-N. Execution node 302-1 includes a cache 304-1 and a processor 306-1. Execution node 302-2 includes a cache 304-2 and a processor 306-2. Execution node 302-N includes a cache 304-N and a processor 306-N. Each execution node 302-1, 302-2, and 302-N is associated with processing one or more data storage and/or data retrieval tasks. For example, a virtual database may handle data storage and data retrieval tasks associated with an internal service, such as a clustering service, a materialized view refresh service, a file compaction service, a storage procedure service, or a file upgrade service. In other implementations, a particular virtual database may handle data storage and data retrieval tasks associated with a particular data storage system or a particular category of data.

Similar to virtual database 1 discussed above, virtual database 2 includes three execution nodes 312-1, 312-2, and 312-N. Execution node 312-1 includes a cache 314-1 and a processor 316-1. Execution node 312-2 includes a cache 314-2 and a processor 316-2. Execution node 312-N includes a cache 314-N and a processor 316-N. Additionally, virtual database 3 includes three execution nodes 322-1, 322-2, and 322-N. Execution node 322-1 includes a cache 324-1 and a processor 326-1. Execution node 322-2 includes a cache 324-2 and a processor 326-2. Execution node 322-N includes a cache 324-N and a processor 326-N.

In some embodiments, the execution nodes shown in FIG. 3 are stateless with respect to the data being cached by the execution nodes. For example, these execution nodes do not store or otherwise maintain state information about the execution node or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each includes one data cache and one processor, alternative embodiments may include execution nodes containing any number of processors and any number of caches. Additionally, the caches may vary in size among the different execution nodes. The caches shown in FIG. 3 store, in the local execution node, data that was retrieved from one or more data storage devices in cloud storage platform 104. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some embodiments, the caches are implemented using high-speed memory devices that provide fast access to the cached data. Each cache can store data from any of the storage devices in the cloud storage platform 104.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some embodiments, the cache resources and computing resources associated with a particular execution node are determined when the execution node is created, based on the expected tasks to be performed by the execution node.

Additionally, the cache resources and computing resources associated with a particular execution node may change over time based on changing tasks performed by the execution node. For example, an execution node may be assigned more processing resources if the tasks performed by the execution node become more processor-intensive. Similarly, an execution node may be assigned more cache resources if the tasks performed by the execution node require a larger cache capacity.

Although virtual databases 1, 2, and n are associated with the same execution platform 110, the virtual databases may be implemented using multiple computing systems at multiple geographic locations. For example, virtual database 1 can be implemented by a computing system at a first geographic location, while virtual databases 2 and n are implemented by another computing system at a second geographic location. In some embodiments, these different computing systems are cloud-based computing systems maintained by one or more different entities.

Additionally, each virtual database is shown in FIG. 3 as having multiple execution nodes. The multiple execution nodes associated with each virtual database may be implemented using multiple computing systems at multiple geographic locations. For example, an instance of virtual database 1 implements execution nodes 302-1 and 302-2 on one computing platform at a geographic location and implements execution node 302-N at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual database.

Execution platform 110 is also fault tolerant. For example, if one virtual database fails, that virtual database is quickly replaced with a different virtual database at a different geographic location.

A particular execution platform 110 may include any number of virtual databases. Additionally, the number of virtual warehouses in a particular execution platform is dynamic, such that new virtual warehouses are created when additional processing and/or caching resources are needed. Similarly, existing virtual databases may be deleted when the resources associated with the virtual warehouse are no longer necessary.

In some embodiments, the virtual databases may operate on the same data in cloud storage platform 104, but each virtual database has its own execution nodes with independent processing and caching resources. This configuration allows requests on different virtual warehouses to be processed independently and with no interference between the requests. This independent processing, combined with the ability to dynamically add and remove virtual databases, supports the addition of new processing capacity for new users without impacting the performance observed by the existing users.

Figure 4:
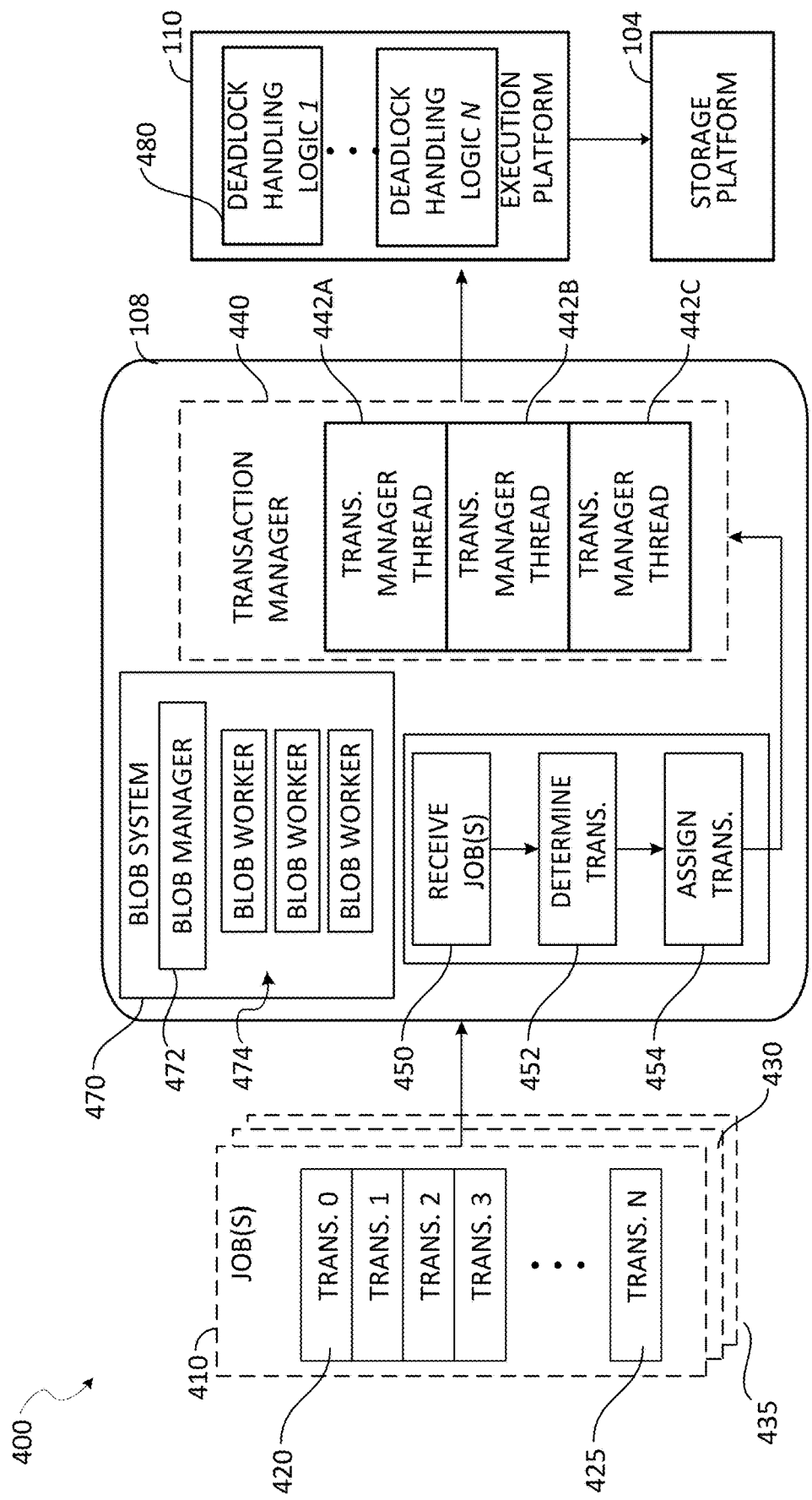
FIG. 4 is a computing environment conceptually illustrating an example software architecture for managing and executing concurrent transactions on a database system, in accordance with some embodiments of the present disclosure.

FIG. 4 is a computing environment 400 conceptually illustrating an example software architecture for managing and executing concurrent transactions on a database system (e.g., the network-based database system 102), which can be performed by a given execution node of the execution platform 110, in accordance with some embodiments of the present disclosure. In an embodiment, a process flow is performed by a transaction manager that is configured to manage and execute transactions as described further herein.

As shown, the transaction manager 440 is included in the compute service manager 108. The transaction manager 440 receives a job 410 that may be divided into one or more discrete transactions 420-425, e.g., transaction 0, transaction 1, transaction 2, transaction 3, and so forth through transaction (n). In an embodiment, each transaction includes one or more tasks or operations (e.g., read operation, write operation, database statement, user defined function, and the like) to perform. The transaction manager 440 receives the job at 450 and determines transactions at 452 that may be carried out to execute the job 410. The transaction manager 440 is configured to determine the one or more discrete transactions, such as transaction 0, transaction 1, transaction 2, transaction 3, and so forth, based on applicable rules and/or parameters. The transaction manager 440 assigns transactions at 454.

As further shown, the transaction manager 440 is configured to concurrently process multiple jobs that can be performed by the execution platform 110. In an example, the transaction manager 440 can receive a second job 430 or a third job 435, each of which include respective discrete transactions that are to be performed on the execution platform 110. Each of the transactions may be executed concurrently by the execution platform 110 in which different operations are performed (e.g., a respective read operation or write operation are executed from each of the transactions by the execution platform 110).

In an implementation, the job 410, including the respective transactions therein, is carried out by the transaction manager 440 which can perform the responsibilities of a query manager (e.g., processing query statements and operations, and the like). As shown, the transaction manager 440 may have multiple threads, including, for example, transaction manager threads 442A, 442B, 442C, and so forth. The transaction manager 440 may assign the job 410, including the multiple discrete transactions, to a particular virtual database of the execution platform 110. Based on this assignment, the transaction manager 440 can send the job 410, including the multiple discrete transactions, to the assigned virtual database for execution. Alternatively, the transaction manager 440 can send a subset of the transactions included in the job 410 for execution by the execution platform 110.

In an embodiment, as described further herein, the transaction manager 440 can perform operations to process transactions (e.g., OLTP) that may be executing concurrently, while handling conflicts and avoiding starvation of resources. Further, as described further herein, the transaction manager 440 handles conflicts between multiple transactions and concurrency issues that can arise when multiple transactions are executing in parallel on the execution platform 110. As further shown, the execution platform 110 communicates with the storage platform 104, which provides a distributed database (e.g., Foundation Database (FDB), and the like), where data can be read and written in connection with performing the transactions.

In an embodiment, the transaction manager 440 schedules and manages the execution of transactions on behalf of a client account. The transaction manager 440 may schedule any arbitrary SQL query included in a given transaction. The transaction manager 440 may assume a role to schedule the job 410 as if it is the client account rather than as an internal account or other special account. The transaction manager 440 may embody the role of, for example, an account administrator or a role having the (smallest) scope necessary to complete the job 410. In an embodiment, the transaction manager 440 embodies the role that owns the object that is the target of the job 410 (e.g., for a cluster, the table being clustered is the target).

In an embodiment, the transaction manager 440 determines transactions at 452 and assigns transactions at 454 that are to be performed to fully execute the job 410. In an embodiment, the transaction manager 440 assigns ordering constraints to any number of the one or more discrete transactions, where applicable. Depending on the constraints of the job 410, the transaction manager 440 may determine that one or more of multiple discrete transactions are to be serialized and executed in a particular order.

In an embodiment, the transaction manager 440 generates a report indicating when the job 410 is scheduled to be executed and how much computing resources are estimated to be tied up executing the job 410. The transaction manager 440 may alert a client account when the job 410 is being executed.

The database system provides concurrency control and isolation for executing transactions against (e.g., a series of SQL Statements within a SQL Transaction) against linearizable storage (e.g., a linearizable key-value store, NoSQL database, an OLAP database or data warehouse). A transaction as referred to herein includes a group of operations executed atomically. In an example, such transactions may include read and write operations but can also include operations such as increment, decrement, compare-and-swap, and the like. Further, it is appreciated that linearizable storage may include any type of distributed database (e.g., Apache HBase).

The following discussion relates to transactions in a given distributed database system. In an example, the transaction manager 440 utilizes a linearizable storage, provided by the storage platform 104, for managing and processing transactions as described herein. In an embodiment, the transaction manager 440 implements a read committed model for performing transactions. As referred to herein, a read committed model can refer to a model that ensures that all read operations performed in a given transaction sees a consistent snapshot of the database (e.g., reading a last set of committed values that existed when the read operation commenced), and the transaction itself successfully commits only if no updates that the transaction has made results in write-write conflicts with any concurrent transactions.

As discussed further herein, the transaction manager 440 implements a two-level transaction hierarchy, where a top-level transaction corresponds to a SQL transaction, and a nested transaction corresponds to a SQL statement within the parent SQL transaction. A given nested transaction can perform operations, such as reads and writes, and can perform a rollback and restart execution zero or more times before succeeding. Upon transaction commit, write operations can become visible, and write locks held by each contained statement can be released.

As mentioned before, the subject system provides concurrency control and isolation for executing a series of SQL Statements within a SQL Transaction against a linearizable storage. As discussed further herein, a transaction manager (e.g., transaction manager 440) is configured to provide a concurrency control mechanism that can be understood as a combination of multi-version concurrency control for read operations (MVCC) and locking for write operations. The subject system provides techniques for read committed isolation where each statement may execute against a different snapshot of the database (e.g., the storage platform 104), with write locks held until transaction commit.

In an embodiment, the linearizable storage as described herein enables each operation to execute atomically between invocation and response. As an example, such a linearizable key-value store ensures that operations execute in an atomic manner consistent with a "real-time" ordering of those operations e.g., when operation A completes before operation B begins, operation B should take effect after operation A. In the context of a database, a first write operation to a row in the table takes effect before a second write or read operation to the same row in the table if the second operation was issued after the first completed.

The examples described herein relate to linearizable storage such as a linearizable database, including, for example, NoSQL systems, and the like. A given NoSQL database refers to a database that stores data in a format other than a tabular format, and can store data differently than in relational tables. Further, Uber's Schemaless is an example of building linearizable Key-Value storage via having a "key" and "value" column in a relational table. Other examples of linearizable databases are: HBase, RocksDB, TiKV, Redis, Etcd.

Some examples of optimizations provided by the subject system include utilizing restricted transactional capabilities offered by some embodiments of storage platform 104, such as FoundationDB, that can be leveraged to enable a more efficient transaction implementation. For example, in a write (/lock/delete) protocol, a write operation is performed, and then a read operation is done to check for (1) any write operation that happened before the write request was submitted (2) any other write operation was submitted concurrently with the write operation that was serialized before. The following example illustrates the above:

T1 starts statement S1

S1 starts a FoundationDB Transaction, and uses its Read Version as the Read Timestamp S1 wishes to write object X, so it first reads object X as of the Read Timestamp Finding no conflicts, S1 writes X, using a timestamped operation to embed the commit timestamp in the key and setting IsCommitEmbedded.

S1 sets a read conflict range on the FoundationDB transaction for all keys with a prefix of X S1 writes a transaction status entry for ID, directly setting it to committed.

T1 commits the FoundationDB Transaction.
  If the transaction commits, then there were no concurrent conflicting transactions.
  If the transaction is aborted, then there was a concurrency conflicting transaction for one of the writes that were done. None of S1's writes, nor the transaction status entry will be persisted. S1 now restarts in the slow path.

In an example, a "read version" refers to a "version" or state of the database that corresponds to when a last operation was successfully committed to the database.

The following relates to a discussion of strict serializability. Whereas linearizability makes a "real-time" ordering and atomicity promise about single operations, strict serializability makes a "real-time" ordering and atomicity promise about groups of operations. In an example, the group of operations is submitted incrementally over time, with a terminal "commit" command being issued. The strictly serializable storage platform may employ techniques such as pessimistic lock-based exclusion or an optimistic validation phase to enable this functionality. In this example, the group of operations is referred to as a transaction as mentioned herein. The subject system can impose restrictions on the transaction, such as the number, size, or duration of the operations, and always reject transactions that exceed these limits.

In an embodiment, read operations may be optimized in the following manner. When reading with a given read timestamp, it may not be feasible for any transaction started after the read timestamp to commit before the read timestamp. Thus, if the Transaction ID is set to be the same as the first statement's read timestamp, then instead of reading [X.0, X.inf], the subject system can read [X.0, X.readTimestamp]. Consequently, this approach can make read operations for old or frequently written data more efficient.

In an embodiment, the subject system implements a two-level transaction hierarchy, where the top-level transaction corresponds to a SQL Transaction, and the nested transaction (referred to as a "StatementContext") corresponds to a SQL statement within the parent SQL Transaction. A given StatementContext performs read and write operations and may be instructed to perform a rollback and restart execution zero or more times before succeeding. In an example, transactions control the collective visibility of all write operations from successful statements. Upon transaction commit, all write operations become visible, and all write locks held by each contained statement are released.

In an embodiment, each object key is associated with a stamp that uniquely identifies a single execution attempt of a statement, which can be by appending a three-part tuple of (Transaction ID, statementNumber, restartCount). The higher order component is the transaction identifier assigned to the SQL-level transaction. The statementNumber identifies the SQL statement within the SQL-level BEGIN/COMMIT block. The restart count tracks which statement restart attempt generated this write operations. A StatementContext is instantiated with this stamp, and applies it to all writes performed through the StatementContext instance.

Stamping keys this way has a number of desirable properties. First, if key1<key2, then key1.suffix1<key2.suffix2, regardless of the values of suffix1 and suffix2. If key1==key2, then the transactionID component of the suffix allows us to resolve the commit status of the object to determine its visibility to the statement. If transactionID1==transactionID2, then Statement Number allows statements to see writes performed by previous statements within the same transaction. The restartCount component of the suffix enables the system to detect and delete obsolete versions of the object that had been left around when a statement has to be restarted.

In a similar fashion each execution of a statement is given a three-part identifier consisting of the statement's read-Timestamp (RTS) and the current values of statementNumber (SN) and restartCount (RC). This approach ensures that each statement that is part of the execution of a SQL statement (or more generally a SQL Transaction), sees either data committed before the SQL statement started or by data written or updated by the transaction itself.

In an embodiment, the transaction manager employs a Transaction Status Table (TST) to keep track of committed and aborted transactions. The TST is a persistent hashmap that maps Transaction ID to its metadata, most notably a list of finalized statement numbers and their final restart count, and the commit outcome including the transaction's commit timestamp (CTS). Transactions that are in progress do not exist in the Transaction Status Table. In an embodiment, the TST can be stored in the storage platform 104, or within memory or cache of the execution platform 110.

The following discussion relates to a read protocol that is utilized by the transaction manager 440.

In an embodiment, the transaction manager 440 uses a read committed transaction isolation level, and each statement may be run with a different read timestamp. In an example, the read request for a given key (or a range of keys) is implemented by executing a linearizable storage read call for all keys with X as their prefix. The call returns versions of X with their stamps and values. The read method returns either the latest version of X made by a transaction that committed before the SQL statement started or which was written by the most recent statement of the transaction itself that was not canceled (if any).

The following discussion relates to a write protocol that is utilized by the transaction manager 440.

In an embodiment, the write protocol checks both for WW (write-write) conflicts and WW deadlocks. The following example describes a single transaction and no conflicts. Assume that object X initially has a stamp of TXN1.0.0 and was committed at timestamp 10. In the following example, it should be understood that the following transactional steps described further below can be done within one transaction, and collectively committed. On failure, or upon exceeding the limitations of the underlying transactional system, the execution can fall back to issuing the operations individually as described in further detail below.

T2 starts and creates S1 of StatementContext(ID=TXN2, Statement Number=1, restartCount=0)

Assume that the constructor obtains a read timestamp from the linearizable storage of 15 by contacting the clock service 130. As mentioned before, the clock service 130 is a component of the storage platform 104 which can be contacted to fetch a number that will be greater than any number previously returned, such as one that correlates to the current time. In an embodiment, clock service 130 is provided separately and is independently contactable from the linearizable storage, or can be integrated into the linearizable storage such that the clock value may be inserted into a written value. The latter operation will be referred to as a timestamped write.

To update value of X, the following sequence of actions is performed in an embodiment:

{
  S1 does a linearizable storage write for X.TXN2.1.0 with a value of 100
  // The next step is for S1 to check for WW (write-write) conflicts by checking whether there is // another transaction that has updated X between the RTS and S1's write.

S1 issues the range read [X.0, X.inf] to obtain the set all versions of X and their stamps The read returns [X.TXN1.0.0, X.TXN2.1.0].

S1 looks up TXN1 in the Transaction Status Table, finds a commit timestamp of 10.

10 is earlier than our read timestamp of 15, so it is not a conflict.

S1 ignores [X.TXN2.1.0] as it belongs to S1

// Assume for now, there were no conflicts detected

S1 finalizes, and records (statement number=1, restart count=0) into the transaction status table for TXN2
}

T2 commits. This will cause the Transaction Status Table record to be updated in linearizable storage to reflect that TXN2 is now committed and its commit timestamp of 20.

At this point there will be two versions of X, one stamped with TXN1.0.0 and the other TXN2.1.0. Subsequent transactions that read X can determine if this new version of X was written by a committed transaction by reading the transaction status record, and determine the CTS of the transaction.

The write protocol for transaction T can now be stated.

In an implementation, each row (object) updated uses two separate linearizable storage transactions:

1) The first linearizable storage transaction of T inserts a new version of the object with its key X suffixed with three-part suffix (T.ID, T.statementNumber, T.restartCount).

2) The second linearizable storage transaction issues a range read with the prefix "X." to obtain the SCT (set of conflicting transactions). The result set is a list of committed or active transactions that wrote (or are writing) new versions of X.

There are a number of possible distinct outcomes to this linearizable storage read call that are evaluated in the following order:

1) SCT is empty in which case T is trivially allowed to proceed.

2) SCT is not empty, but for all Ti in SCT, Ti has committed before T's read timestamp, and thus are not WW (write-write) conflicts. T may proceed.

3) SCT is not empty; for all Ti in SCT, Ti is committed; and there exists a Ti in SCT, such that its CTN is greater than T's read timestamp. T is permitted to restart without delay.

4) SCT is not empty, and for one or more Ti in SCT, Ti has not yet committed or aborted. T waits for all transactions in SCT to complete before restarting the current statement.

5) SCT is not empty, and for one or more Ti in SCT, Ti. TransactionID is the same as our own transaction ID, and Ti. StatementCount is less than our current statement count. This means that currently the lock is held, as a previous statement took it and successfully finished its execution. T may proceed.

6) SCT is not empty, and for one or more Ti in SCT, TI.TransactionID is the same as our own transaction ID, Ti. StatementCount is the same as our own StatementCount, and Ti.RestartCount is less than our own restart count. This is a lock from a previous execution of our own transaction, thus T holds the lock on this row, and T may proceed.

For all cases, the object (X.Stamp, Value) will be left in the database (e.g., the storage platform 104). For (3) and (4) which require restarts, the object is left to serve as a write lock. In general, all tentative writes for an object X will form a queue of write locks. (5) and (6) illustrate the cases where previously left write locks allow subsequent statements or restarts of a statement to recognize that they already hold the lock that they wish to take.

The following discussion describes an example that illustrates a write-write (WW) conflict. A write-write conflict, which is also understood as overwriting uncommitted data, refers to a computational anomaly associated with interleaved execution of transactions. To simplify the example, stamps are omitted. Assume that before either T1 or T2 starts that object X has a value of 500, a stamp of TXN1.0.0, and a CTN of 10.

T1 starts and gets a read timestamp of 15

T2 starts and gets a read timestamp of 20

T2 writes (key=X.T2, value=100)

T2 issues a linearizable storage read with range [X.0, X.Inf]. The set SCT will be empty so T2 continues T1 writes (key=X.T1, value=50)

T1 issues a linearizable storage read with range [X.0, X.Inf]. The set SCT will contain T2 so T1 must restart T2 successfully commits. T1's CTN for X will be >20. Assume it is 21

After waiting until T2 either commits or aborts, T1 restarts the statement with a read TS>21.

The following discussion relates to a delete protocol utilized by the transaction manager 440.

In an embodiment, delete operations are implemented as a write of a sentinel tombstone value; otherwise, delete operations employ the same protocol as write operations. When a read operation determines that the most recently committed key is a tombstone, it considers that key to be non-existent.

The following discussion relates to a lock protocol utilized by the transaction manager 440.

To support a query statement of SELECT . . . FOR UPDATE, the transaction manager API offers StatementContext::lock(Key), which allows rows to be locked without writing a value to them. The implementation of lock( ) follows the write protocol, except that it writes a special sentinel value to indicate the absence of a value (distinct from SQL NULL). A SELECT . . . FOR UPDATE statement may also be forced to restart several times before the statement finishes successfully. Once it does, subsequent statements in the transaction will recognize the existence of this key as an indication that they hold the lock (in accordance with cases (5) and (6) above). All reads can ignore the key as a write.

The following discussion relates to determining whether to commit, abort, or restart a given transaction which can be determined by the transaction manager 440.

When a transaction finishes its execution, it will either have an empty SCT, indicating that the commit can proceed, or an SCT with one or more conflicting transactions, indicating that the transaction will need to restart.

When a statement is restarted, all writes stamped with a lower restartCount are left in the database (e.g., the storage platform 104) as provisional write locks for the next execution. The next execution of the statement might write a different set of keys. The set difference between the first and second execution form a set of orphaned writes that are removed and never become visible. The statement itself may not be relied upon to always be able to clean up its own orphaned writes, as in the event of a process crash, the location of the previous writes will have been forgotten. Finalizing statements and recording the restart count of the successful execution promises that only the results of one execution will ever become visible, and permits orphaned writes to be lazily cleaned up.

A transaction is committed, and all of its writes made visible, by inserting its Transaction ID into the Transaction Status Table. The commit timestamp is filled in by the clock service 130 or directly by the distributed database (e.g., FoundationDB), such that it is higher than any previously assigned read or commit timestamps. All writes are completed before a statement may be finalized, and all statements are finalized before the transaction may be committed.

A transaction is aborted by inserting its Transaction ID into the Transaction Status Table, with its transaction outcome set as aborted. The list of finalized statements and their restart counts will be reset to an empty list. The insertion into the Transaction Status Table will make the abort outcome visible to all conflicting transactions, and all writes performed by finalized statements may be proactively or lazily removed from the database (e.g., the storage platform 104).

When a statement tries to finalize with a non-empty SCT, it waits for commit outcomes to be persisted to the Transaction Status Table for all conflicting transactions. Once all conflicting transactions have committed or aborted, then the transaction will begin its restart attempt.

The following discussion relates to an API (e.g., the transaction manager API as referred to below) that can be utilized (e.g., by a given client device) to send commands and requests to the transaction manager 440.

A SQL transaction contains a sequence of one or more SQL statements. Each SQL statement is executed as a nested transaction, as implemented by the transaction manager StatementContext class. Each transaction manager statement itself is executed as one or more database transactions.

In an embodiment, the transaction manager API is divided into two parts: 1) the data layer, which provides a read and write API to the transaction execution processes; and 2) the transaction layer, which provides, to the compute service manager 108, an API to orchestrate the transaction lifecycle. In an implementation, transactions operate at a READ COMMITTED isolation level and implement MVCC on top of the distributed database (e.g., storage platform 104) to avoid taking any read locks.

Consider the following example SQL query:
Update   emp.Salary=emp.Salary*1.1   where emp.Dept="shoe";

In an example, an instance of the StatementContext class will be created to execute this SQL statement. The constructor contacts the linearizable storage transaction manager to begin a linearizable storage transaction and obtain a linearizable storage STN which is then stored in the readTimestamp variable.

The Update operation then executes across any number of execution nodes, all using the same StatementContext instance. In an example, a function rangeRead( ) will be used to scan the base table, or an index on Dept, for the tuples to update. A series of write( ) calls will be made to update the salary of all matching employees.

A call to finalize( ) will return CONFLICT if the statement encountered any conflicts during its execution, to indicate that re-execution is needed. The key to restarts making progress is that the first execution of the statement will have the side effect of, in effect, setting write locks on the objects being updated. This ensures that when the statement is re-executed the necessary writes locks have already been obtained and the statement will generally (but not always).

Next, consider an example illustrating Write-Write conflicts between 3 transactions:
T1 starts S1 with timestamp 10
T2 starts S2 with timestamp 20
T3 starts S3 with timestamp 30
S1 writes X
S2 writes Y
S3 writes Z
S1 writes Y, and notes the conflict with T2
S2 writes Z, and notes the conflict with T3
S3 writes X, and notes the conflict with T1

In this case described above, three transactions are involved in a deadlock. Each statement believes that it should restart and wait for the execution of the previous transaction to finish. No transaction has the complete information to know that it is involved in a deadlock.

Thus, when a statement fails to finalize due to conflicts, it instead writes its conflict set into the database (e.g., the storage platform 104). These conflict sets may be read by all other transactions, allowing them to detect a cycle in the waits-for graph, indicating that they're involved in a deadlock.

In database systems, a deadlock can refer to a situation where two or more transactions are waiting for one another to give up locks. As an example, deadlocks can be handled by deadlock detection or prevention in some embodiments. The following discussion relates to example mechanisms for handling deadlocks utilizing distributed approaches that do not require a centralized deadlock handling component or implementation. For example, in an implementation, a particular execution node, (e.g., execution node 302-1 and the like) in the execution platform 110 can perform at least some of the following operations described below.

Deadlock detection: A basic idea of deadlock detection is to detect a deadlock after the deadlock occurs such that that a particular transaction can be aborted. This can be done by finding cycles in a wait-for graph. Depending on how deadlock detection is performed, deadlock detection can be classified as:
 Online detection: whenever a transaction wishes to acquire a lock, it adds an edge to the wait-for graph. The transaction is aborted if this new edge will cause a cycle.
 Offline detection: the system periodically collects the pending lock requests from all transactions to construct a wait-for graph and perform cycle detection.

Deadlock prevention: A basic idea of deadlock prevention is to enforce some restrictions on locking so that deadlocks can never happen. Example techniques include:
 Timeout: a transaction is assumed to be involved in a deadlock if its lock request cannot be granted after a certain time period, e.g., 5 seconds.
 Non-blocking 2PL: whenever a conflict happens, a transaction is aborted immediately.
 Wait-die: when a transaction Ti requests a lock that is held by Tj, Ti is only allowed to wait if Ti is older than Tj. Otherwise Ti is aborted immediately.
 Wound-wait: when a transaction Ti requests a lock that is held by Tj, Tj is aborted if Ti has a higher priority than Tj. Otherwise, Ti will wait.

In embodiments, the database system implements a distributed database (e.g., storage platform 104) for executing distributed transactions, and utilizes locking for concurrency control where any deadlocks are handled in a distributed manner by a particular execution node executing a particular transaction (e.g., execution node 302-1 and the like).

In some embodiments, the database system provides the following:

No false deadlocks: Deadlocks generally represent some bugs in the user's application code. By providing accurate and informative deadlock information, embodiments of the database system enables a user to fix these deadlocks.

Distributed/decentralized deadlock handling: transaction manager 440 is designed for executing distributed transactions in the cloud. In an embodiment, the transaction manager 440 creates one job (with one or more execution node workers) to execute a transaction. It can be desirable that each transaction handles deadlocks independently without requiring a centralized transaction manager.

The following discussion describes a deadlock detection and resolution protocol for the database system to meet the two aforementioned requirements. In order to meet the goal of no false deadlocks, the database system performs deadlock detection on the wait-for graph and only aborts a transaction if it finds a cycle in the graph. To meet a goal of not utilizing a centralized transaction manager, each transaction (e.g., executing on a given execution node) are able to exchange wait-for information and perform deadlock detection independently. Further, the database system implements a deadlock detection algorithm that is deterministic so that all transactions can unanimously agree on which transactions to abort.

In the following discussion, it is understood that statements in a transaction are executed serially e.g., one at a time. As discussed further below, the database system can then extend a deadlock detection protocol as described herein to support parallel statement execution.

In the discussion below, "transaction" and "statement" are used interchangeably because it is assumed that statements of a transaction will be executed serially, e.g., one at a time. In an example, the database system utilizes a deadlock detection and resolution protocol that enables transactions to store their wait-for information into a dedicated table in a distributed database (e.g., storage platform 104). A transaction waiting for conflicting transactions can periodically run a deterministic deadlock detection algorithm. If a transaction determines that it is a victim in a deadlock, the transaction can abort itself so that other transactions can proceed.

In some implementations, the execution platform 110 can provide deadlock handling logic 480 (e.g., deadlock handling logic 1 to deadlock handling logic N, which can correspond respectively to each transaction 420 to transaction 425) which implements the deadlock detection and resolution protocol mentioned herein, and is provided or utilized by each given execution node that is currently executing a given transaction(s). In another embodiment, each deadlock handling logic can be provided to a corresponding transaction (or statement within a transaction) for deadlock detection and resolution as described further herein.

In an embodiment, wait-for information of transactions is stored in a wait-for table in the distributed database (e.g., storage platform 104). The wait-for table includes a set of key-value pairs where both keys and values are transaction IDs. A key-value pair <Ti, Tj> means that Ti is currently waiting for Tj, e.g., there is an edge Ti→Tj in the wait-for graph.

In order to satisfy the deterministic requirement, each transaction Ti reports Ti→Tj only if Tj is the oldest conflicting transaction that Ti is waiting for (a transaction's age is determined by its transaction ID, e.g., a younger (e.g., newer) transaction will have a larger transaction ID). By ensuring that there is at most one ongoing edge from each transaction, it is straightforward to see that each transaction can participate in at most one cycle. Thus, the youngest transaction (with the largest transaction ID) can be aborted in each cycle to deterministically resolve deadlocks.

In some example embodiments, the compute service manager 108 further comprises a blob system 470 to manage large or complex reads that are issued against a key-value database (e.g., OLTP database, key-value storage device 122). As illustrated, the blob system 470 comprises a blob manager 472 to assign and manage blob data using a plurality of blob workers 474, as discussed in further detail below with reference to FIGS. 8-10. In the example of FIG. 4, the blob system 470 and sub-components are hosted on the compute service manager 108 to manage embodiments where the key-value database or OLTP database is hosted locally within the network-based database system 102. It is appreciated that the blob system 470 can be hosted in other places, such as remotely on a storage platform 104 (e.g., in the key-value storage device 122 hosted on storage platform 104).

Figure 5:
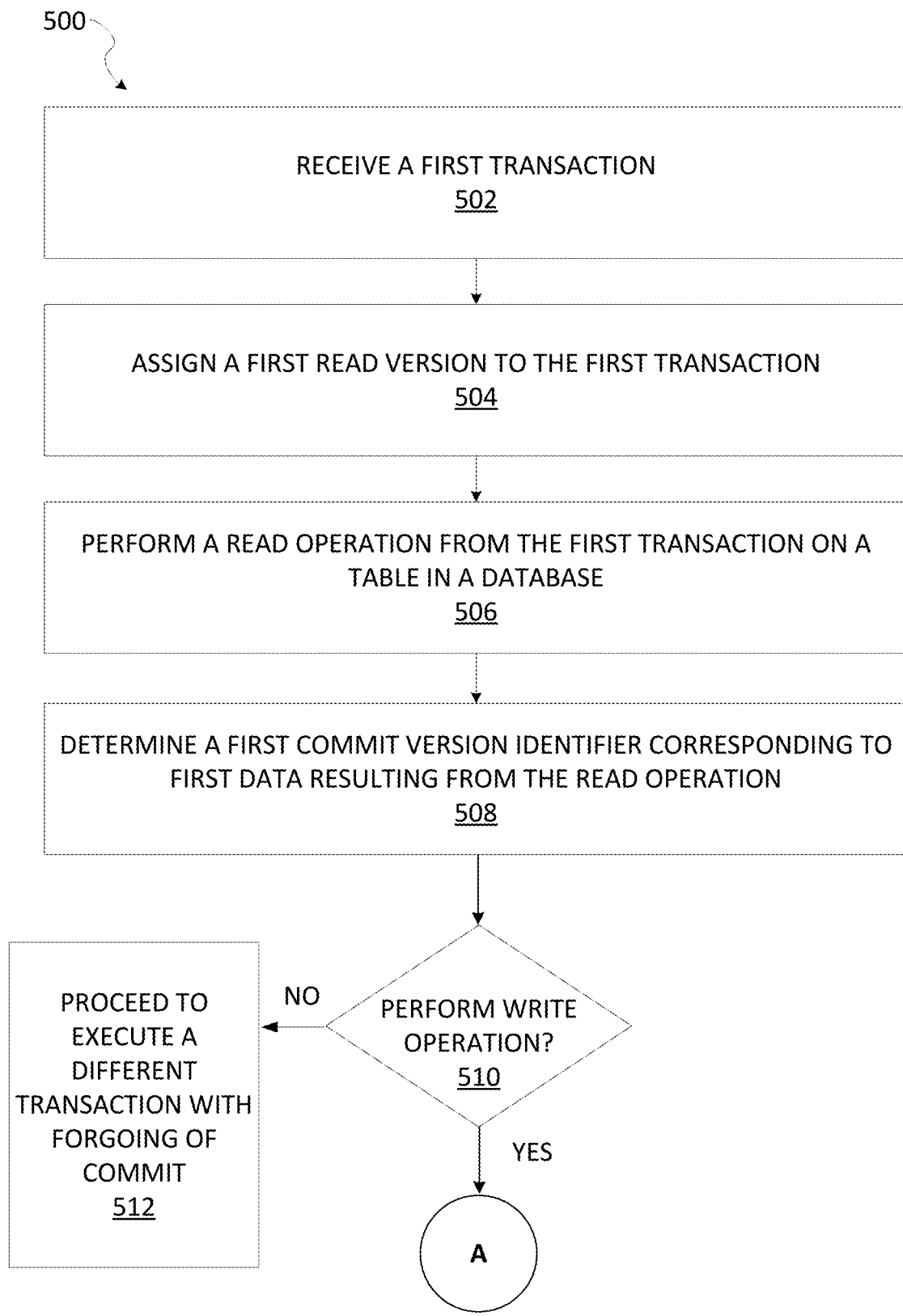
FIG. 5 is a flow diagram of method for implementing database transactions, in accordance with some embodiments of the present disclosure.

FIG. 5 is a flow diagram illustrating operations of a database system in performing a method, in accordance with some embodiments of the present disclosure. The method 500 may be embodied in computer-readable instructions for execution by one or more hardware components (e.g., one or more processors) such that the operations of the method 500 may be performed by components of network-based database system 102, such as components of the compute service manager 108 or a node in the execution platform 110. Accordingly, the method 500 is described below, by way of example with reference thereto. However, it shall be appreciated that the method 500 may be deployed on various other hardware configurations and is not intended to be limited to deployment within the network-based database system 102.

At operation 502, the transaction manager 440 receives a first transaction that is to be executed on linearizable storage.

At operation 504, the transaction manager 440 assigns a first read version to the first transaction. The first read version indicates a first version of the linearizable storage. Alternatively, a read timestamp can be retrieved from a clock service (e.g., the clock service 130), and a transaction identifier can be assigned to the first transaction where the transaction identifier corresponds to a read start time.

At operation 506, the transaction manager 440 performs a read operation from the first transaction on a table in a database.

At operation 508, the transaction manager 440 determines a first commit version identifier corresponding to first data resulting from the read operation.

At operation 510, the transaction manager 440 determines whether a particular write operation is included in the first transaction. If the particular write operation is to be performed with the first transaction, then the transaction manager 440 proceeds to perform a method as described below in FIG. 7.

Alternatively, when the transaction manager 440 determines that a particular write operation is absent from the first transaction, at operation 512, the transaction manager 440 proceeds to execute a different transaction (along with forgoing performance of a commit process for the first transaction), which is described, in an example, in FIG. 6 below. It is appreciated that due to the concurrency of transactions that are performed, the operations described further below in FIG. 6 can be executed at any time during the operations described in FIG. 5 above.

Figure 6:
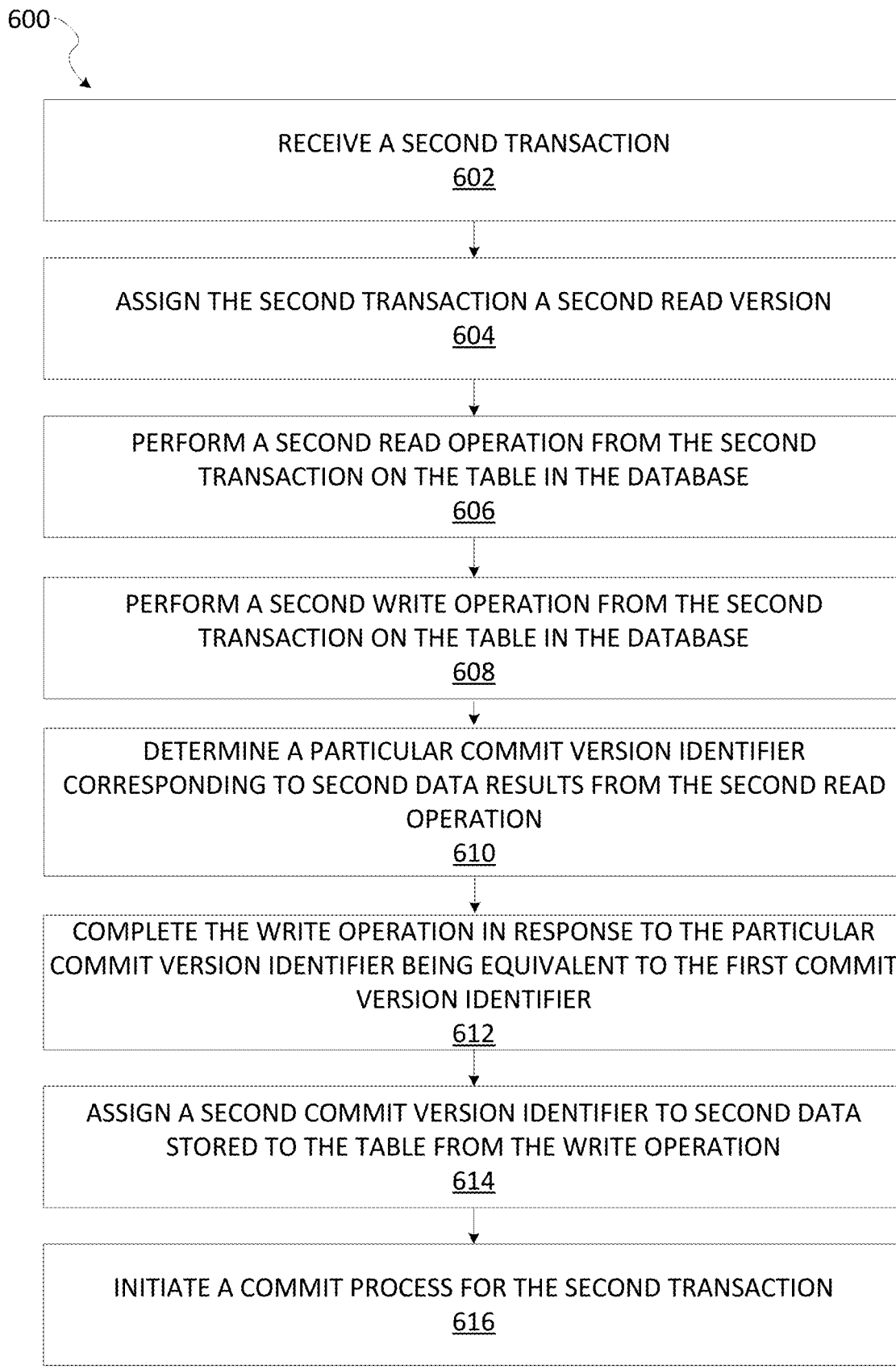
FIG. 6 is a flow diagram illustrating operations of a database system in performing a method, in accordance with some example embodiments.

FIG. 6 is flow diagram illustrating operations of a database system in performing a method, in accordance with some embodiments of the present disclosure. The method 600 may be embodied in computer-readable instructions for execution by one or more hardware components (e.g., one or more processors) such that the operations of the method 600 may be performed by components of network-based database system 102, such as components of the compute service manager 108 or a node in the execution platform 110. Accordingly, the method 600 is described below, by way of example with reference thereto. However, it shall be appreciated that the method 600 may be deployed on various other hardware configurations and is not intended to be limited to deployment within the network-based database system 102.

In some embodiments, the method 600 can be performed in conjunction with the method 500 as discussed above. For example, the method 600 can be performed after the operations of the method 500 or performed substantially concurrently with the method 500. At operation 602, the transaction manager 440 receives a second transaction to be executed on linearizable storage. At operation 604, the transaction manager 440 assigns the second transaction a second read version that indicates a second version of the linearizable storage. At operation 606, the transaction manager 440 performs a second read operation from the second transaction on the table in the database. At operation 608, the transaction manager 440 performs a second write operation from the second transaction on the table in the database. At operation 610, the transaction manager 440 determines a particular commit version identifier corresponding to second data results from the second read operation. At operation 612, the transaction manager 440 completes the write operation in response to the particular commit version identifier being equivalent to the first commit version identifier. At operation 614, the transaction manager 440 assigns a second commit version identifier to second data stored to the table from the write operation, the second commit version identifier corresponding to a second version of data in the table. The second commit version identifier is different than the first commit version identifier. At operation 616, the transaction manager 440 initiates a commit process for the second transaction.

Figure 7:
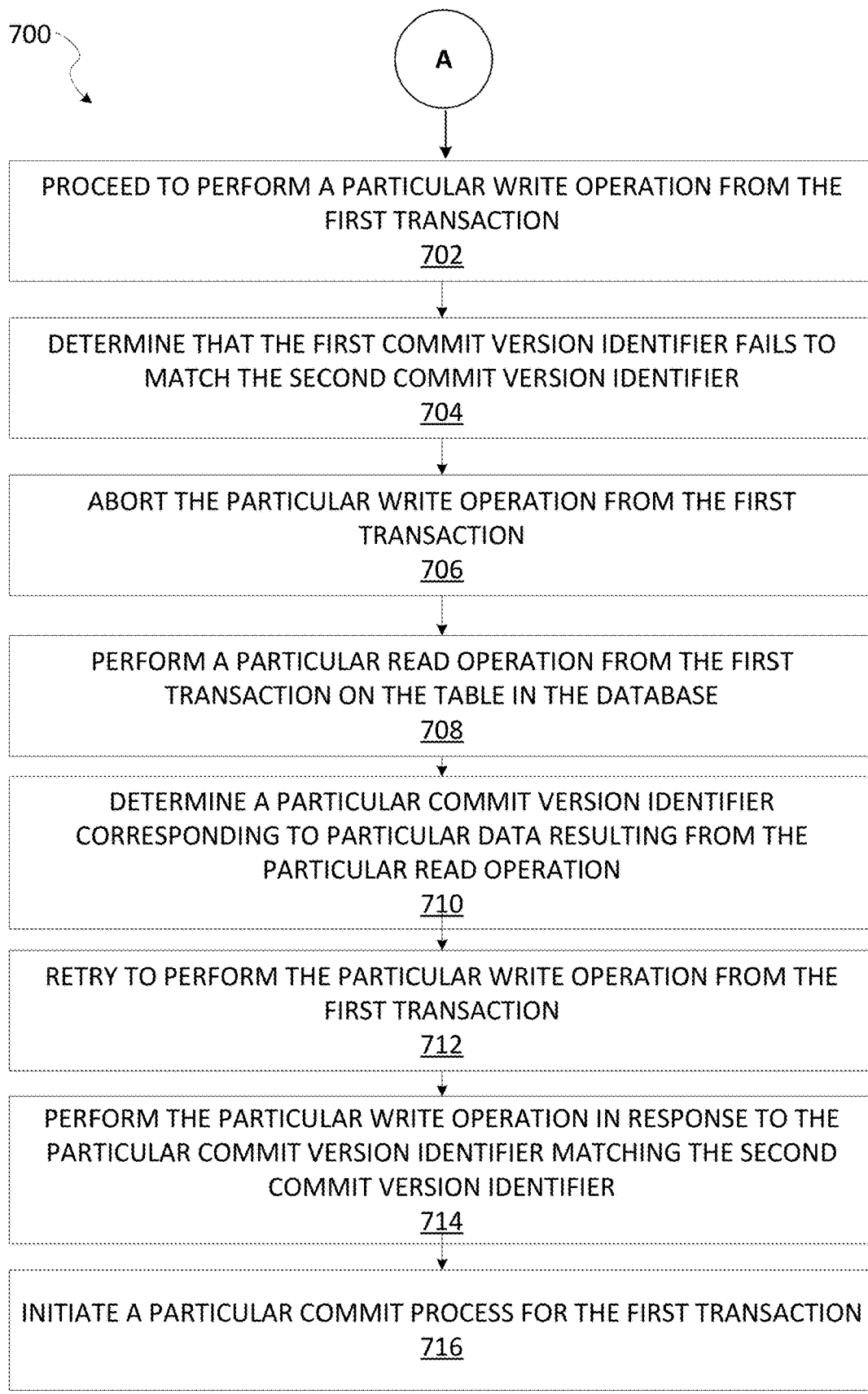
FIG. 7 is a flow diagram illustrating operations of a database system in performing a method, in accordance with some example embodiments.

FIG. 7 is a flow diagram illustrating operations of a database system in performing a method, in accordance with some embodiments of the present disclosure. The method 700 may be embodied in computer-readable instructions for execution by one or more hardware components (e.g., one or more processors) such that the operations of the method 700 may be performed by components of network-based database system 102, such as components of the compute service manager 108 or a node in the execution platform 110. Accordingly, the method 700 is described below, by way of example with reference thereto. However, it shall be appreciated that the method 700 may be deployed on various other hardware configurations and is not intended to be limited to deployment within the network-based database system 102.

In some embodiments, the method 700 can be performed in conjunction with the method 500 and the method 600 as discussed above. For example, the method 700 can be performed after the operations of the method 500 or the method 600 (or performed substantially concurrently therewith either method).

At operation 702, the transaction manager 440 proceeds to perform a particular write operation from the first transaction. At operation 704, the transaction manager 440 determines that the first commit version identifier fails to match the second commit version identifier. At operation 706, the transaction manager 440 aborts the particular write operation from the first transaction. At operation 708, the transaction manager 440 performs a particular read operation from the first transaction on the table in the database. At operation 710, the transaction manager 440 determines a particular commit version identifier corresponding to particular data resulting from the particular read operation. At operation 712, the transaction manager 440 retry to perform the particular write operation from the first transaction. At operation 714, the transaction manager 440 perform the particular write operation in response to the particular commit version identifier matching the second commit version identifier. At operation 716, the transaction manager 440 initiates a particular commit process for the first transaction.

Figure 8:
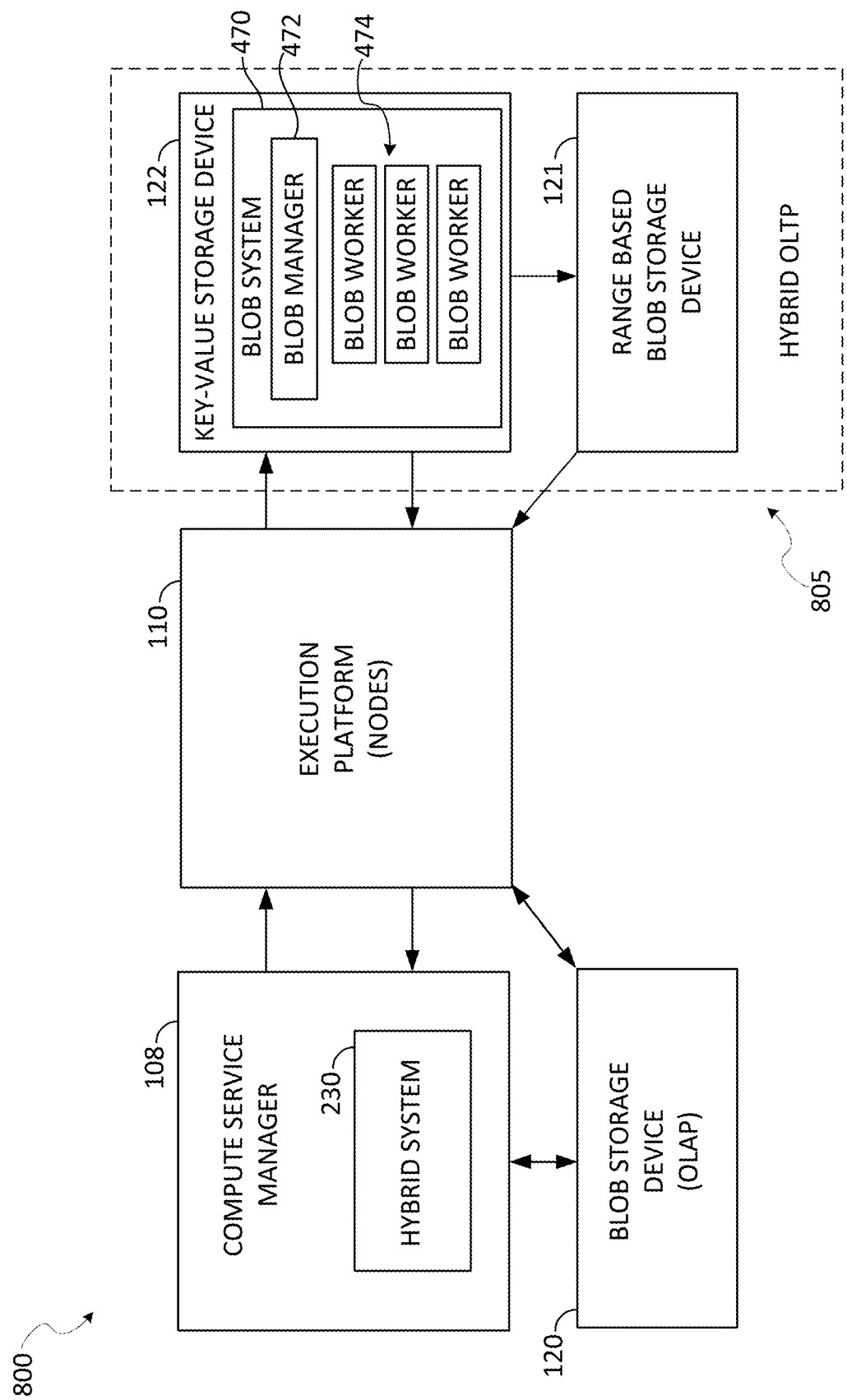
FIG. 8 shows an example hybrid database architecture, in accordance with some example embodiments.

FIG. 8 shows an example hybrid database system 800, in accordance with some example embodiments. At a high level, the analytical style data (e.g., OLAP data) is stored and managed using the blob storage device 120 (e.g., partitions of data are stored in blob storage device 120) and metadata storage to track the partition data (e.g., metadata databases 112, key-value storage device 122 having key-value based metadata to track the partitions), where compute service manager 108 and the execution platform (e.g., execution nodes, FIG. 3) perform writes and reads of the blob storage device 120 in response to analytical style queries (e.g., OLAP queries), in accordance with some example embodiments.

Further, in the illustrated example of FIG. 8, the range-based blob storage device 121 operates in a hybrid OLTP system 805 that can function as a OLTP database for small transactions (e.g., point lookups) and provide results for large reads (e.g., OLTP style reads) using the range-based blob storage device 121, where the execution platform 110 (e.g., a plurality of compute instances instantized on the client side) receives pointer data for the large reads from the blob system 470, and the execution platform 110 then performs the read request by pulling data from the range-based blob storage device 121. In some example embodiments, the range-based blob storage device 121 is configured differently than the blob storage device 120 in that range-based blob storage device 121 is kept transactionally consistent with the transactional OLTP data in the key-value storage device 122. The range-based blob storage device 121 further different than the blob storage device 120 in that is strictly range partitioned to provide large reads against OLTP data.

To write data using the hybrid database system 800, the compute service manager 108 first compiles a SQL statement (e.g., a query received from client device 114), and the execution platform uses the SQL statement to convert the query into key-value transactions that can be issued against the key-value storage device 122. The key-value storage device 122 commits the transactions and then streams the data to the range-based blob storage device 121 after committed. The blob system 470 is configured to dynamically divide the keyspace of the key-value storage device 122 database into range granules, which are then batch written to the range-based blob storage device 121.

To read data using the hybrid database system 800, the hybrid system 230 receives a query and determines whether the query should be completed directly against the key-value storage device 122 or should be handled using the blob system 470. The threshold analysis of whether to handle directly on the KV table or to use the blob system can be configured per different data requirements of an organization implementing the hybrid database system 800. For instance, if the query is a read request that requires reading more than a specified limit of data (e.g., more than 10 MB of data, more than a gigabyte of OLTP data, etc.) then the blob system 470 is used, whereas if less than the specified limit, the query is completed by the execution platform 110 directly on the key-value storage device 122. Although data size is discussed here, and as an example, other threshold limits can be implemented, such as a maximum number of rows, query complexity (e.g., large aggregations), and so on. To continue the example, assuming the received read is a large read, the compute service manager dispatches range granules used by the query to the execution platform 110. The execution platform 110 determines which blob files (snapshot and deltas) are associated with each range granule received from the compute service manager 108. The blob system 470 then determines which blob files are necessary to read a range granule at a specific version and returns, to the execution platform 110, the necessary blob files as a list of pointers so that the execution node cluster can retrieve the files and perform the read from the range-based blob storage device 121. In some example embodiments, the blob system 470 writes KV data to the range-based blob storage device 121 in batches, and as such, when a given large read is received, there may be relevant data that is not yet written to the range-based blob storage device 121. To this end, in some example embodiments, in addition to the list of pointers sent by the key-value storage device 122 to the execution platform 110 for a given read request, the blob system further provides, to the execution platform 110, all of the changes to a given range granule that have not yet been written to blob storage.

The blob manager 472 is configured to manage distributing range granules to the blob workers 474. In some example embodiments, the blob manager 472 balances the number of ranges each blob worker is responsible for, and the amount of write traffic each blob worker is handling in aggregate. The write traffic is estimated by the amount of time it took to rewrite the previous snapshot file for the range. In some example embodiments, when a given blob worker has written 6 MB of data to a range, it will notify the blob manager 472 that a new snapshot file is needed for the range. In addition, at startup if a range is detected to have more than 6 MB of delta files outstanding, the given blob worker will go notify the blob manager that a new snapshot is to be written.

In some example embodiments, once a blob worker knows it needs to rewrite a range, it will query the key-value database of key-value storage device 122 to determine the size of the range. If the range is larger than a set amount (e.g., 15 MB) it will ask the key-value storage device 122 to split the range into 10 MB chunks, keeping the two chunks as equal in size as possible. If the range is smaller than 5 MB, the blob worker will query the ranges before and after the range and merge the range with the smaller of the two options, potentially splitting the merged range if it is larger than 15 MB.

As discussed, each of the blob workers are responsible for updating and querying range granules assigned to them by the blob manager 472. In some example embodiments, after the initial work of being assigned a range, a blob worker will consume mutations from the range feed, and buffer them in memory, ordered by version. In some example embodiments, a blob worker will periodically flush the buffer to create a delta file for the granule which can also be compacted into a snapshot after a set amount of delta files (e.g., flush a new delta file for the granule every 500 KB of new mutations, and compact into a snapshot file every 10 delta files).

In some example embodiments, a given portion of a read request is sent to the blob worker which owns the associated range granule. The blob worker ensures it has consumed all of the mutations through the read version of the request. It then returns the file pointers (snapshot and deltas) plus any required mutations which have not been written to a blob file yet. In some example embodiments, the client is returned a list of pointers, and the client starts with the snapshot file, then applies the mutations from delta files and memory to produce the final read result.

Figure 9A:
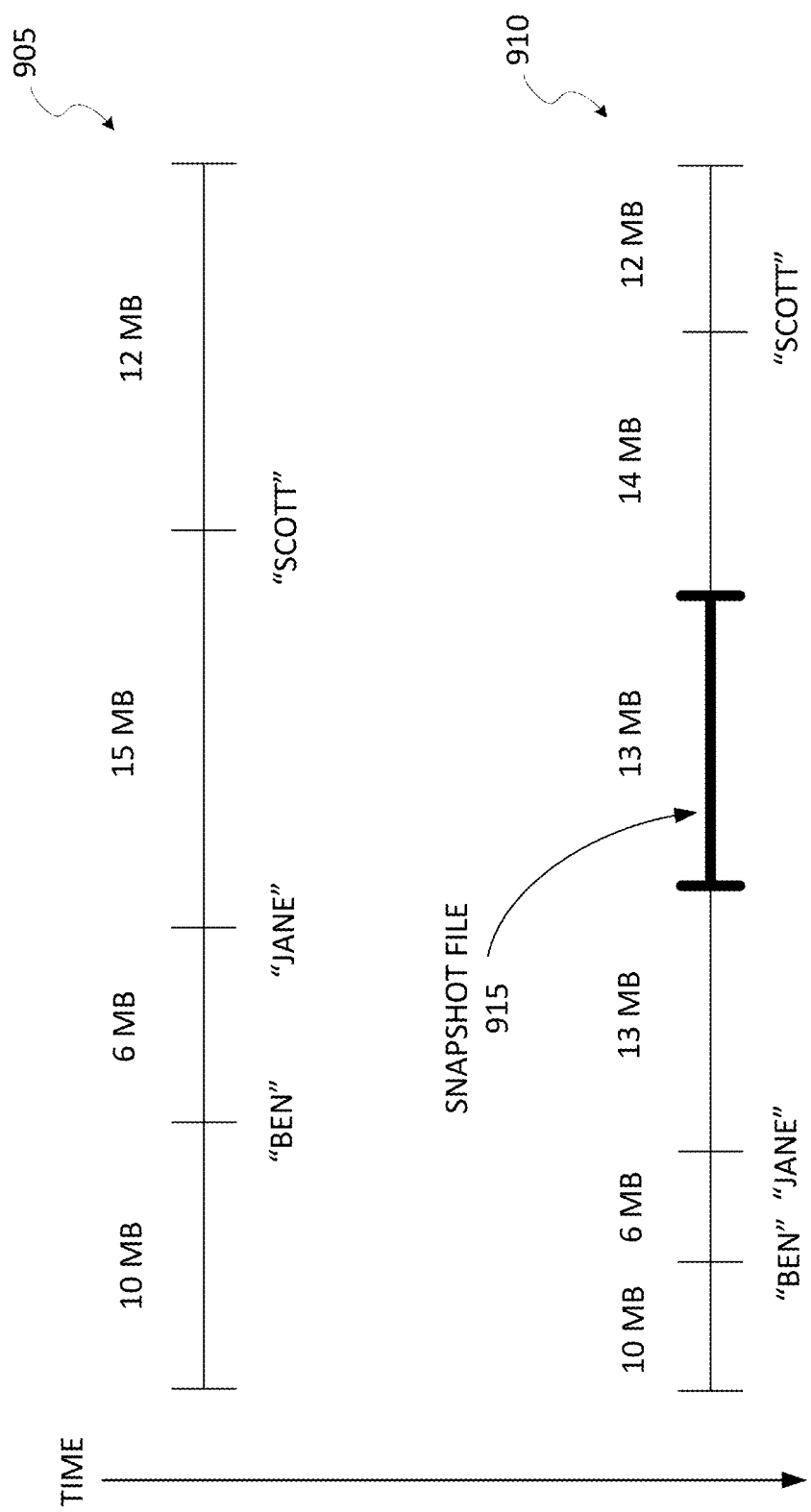
FIGS. 9A and 9B show example blob data, according to some example embodiments.
Figure 9B:
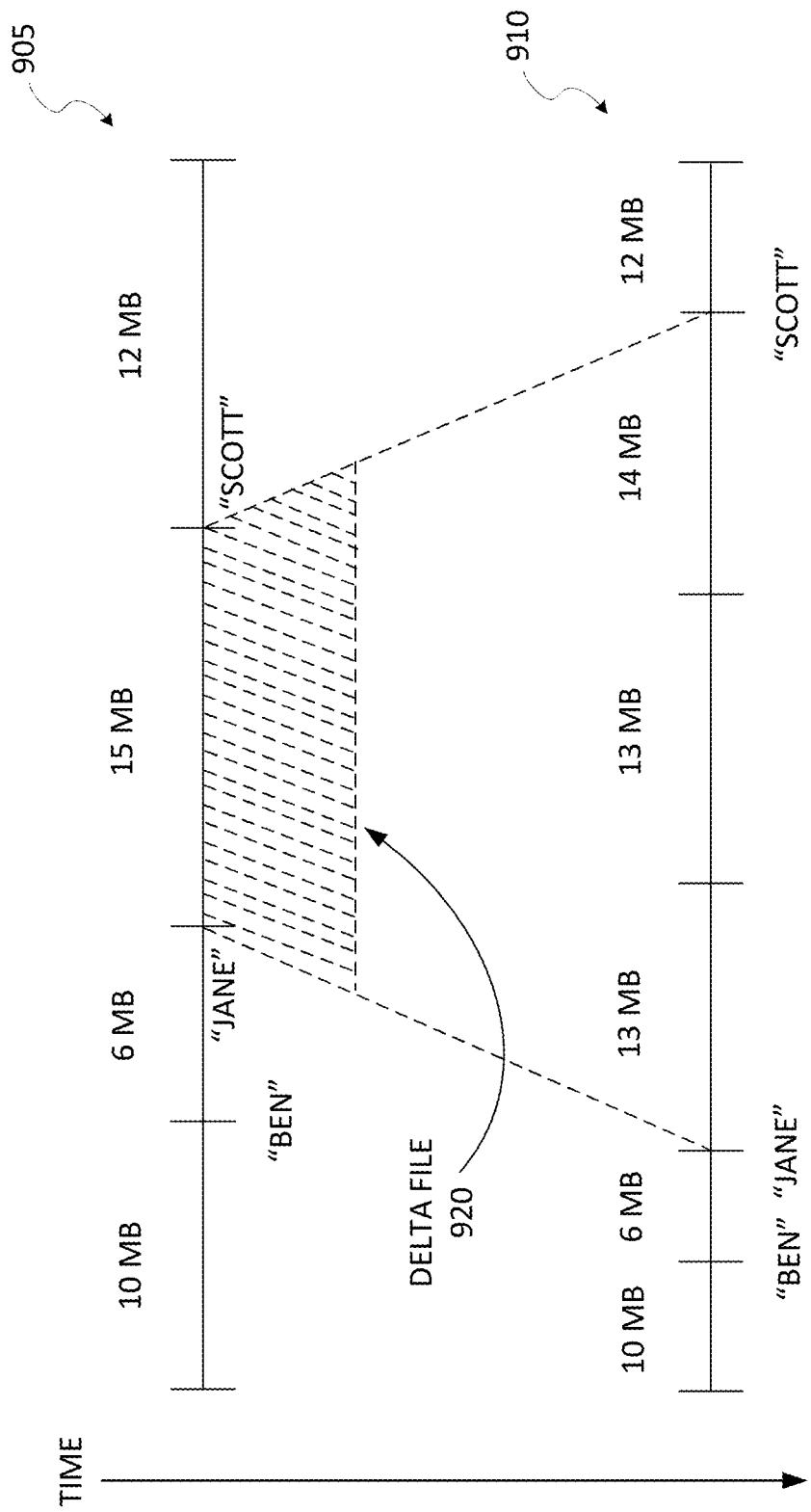

FIG. 9A and FIG. 9B show example blob data, according to some example embodiments. FIG. 9A shows a data structure (e.g., KV data, OLTP database data) at a first time 905 and a second time 910, where changes have been made to the data as indicated by the increase in granule size between the "Jane" record and the "Scott" record. As discussed, instead of the client (e.g., execution nodes of the client) getting back a sorted set of rows, the client receives blob data, including all of the filenames and mutations necessary to reconstruct the rows from blob storage. Specifically, the response provide to the client is a list of chunks, where each chunk contains the information needed to reconstruct the rows for each blob granule. These chunks are given in a vector, ordered by key, because the client's keyRange may not correspond to blob granule boundaries. In some example embodiments, the information of a given granule (e.g., the data between Jane and Scott) include: (1) the key range of the granule, (2) the snapshot file (e.g., snapshot file 915), zero or more delta files (e.g., delta file 920), and (3) any in-memory delta data of data not yet written to blob. FIG. 9A illustrates a snapshot file 915, which is a vector of sorted key-pairs of a given size (e.g., 13 MB in FIG. 9A). With reference to FIG. 9B, the delta file 920 is a list of mutations (e.g., log) in the range granule (e.g., list of changes made to any data between the Jane and Scott records) that occurred after the snapshot file 915 file was created. In some example embodiments, the snapshot and delta files implement a columnar file format (e.g., flatbuffers file format).

Figure 10:
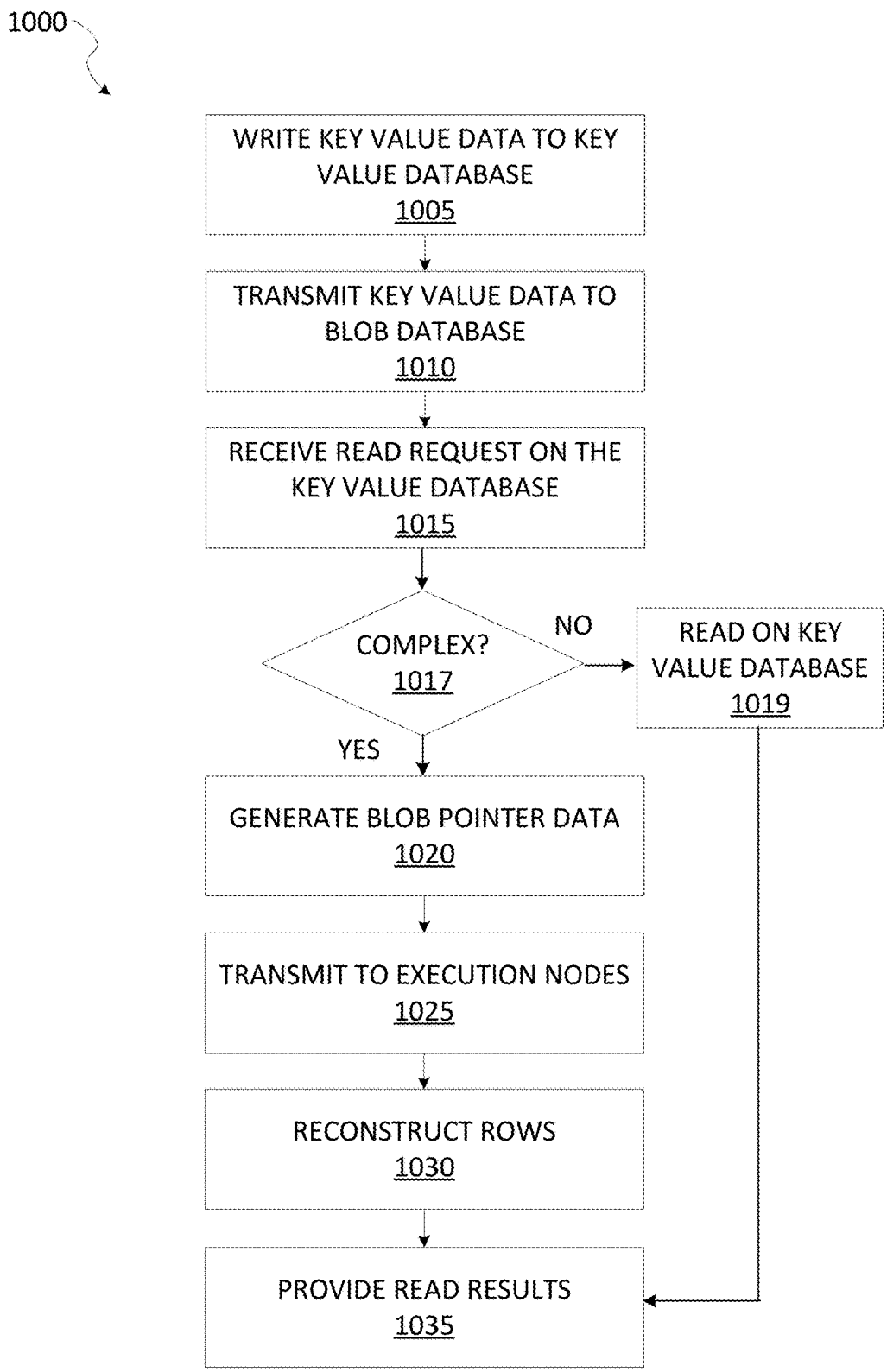
FIG. 10 shows a flow diagram of a method for performing large reads on a hybrid database, according to some example embodiments.

FIG. 10 shows a flow diagram of a method 1000 for performing large reads on a hybrid database, according to some example embodiments. At operation 1005, the transaction manager 440 writes KV data to the key-value storage device 122. At operation 1010, the blob system 470 transmits (e.g., replicates) the key-value data to blob storage, such as the range-based blob storage device 121. At operation 1015, the hybrid system 230 receives a read request on the KV database. At operation 1017, the hybrid system 230 determines whether the received read is a complex request (e.g., a large read on OLTP data, a complex analytical OLAP-style read with multiple aggregations, a read that reads more than a preset limit of data, such as 1 gigabyte).

As an example, if at operation 1017 the hybrid system 230 determines that the read request is not a large request (e.g., not a large read, not a complex analytical-style request), then the hybrid system 230 completes the query against the key-value data store (e.g., key-value storage device 122) at operation 1019 without using the blob system to provide results at operation 1035.

Alternatively, if at operation 1017, the hybrid system 230 determines that the read request is a complex request (e.g., a large read of OLTP data), then the hybrid system determines that the request should be handled by the blob system 470 and the method 1000 proceeds to operation 1020, operation 1025, and operation 1030.

At operation 1020, the blob system 470 generates blob pointer data, such as snapshot files and delta files for row reconstruction. At operation 1025, the blob system 470 transmits the blob pointer data to execution nodes (e.g., execution nodes, a cluster of compute instances activated by a client). At operation 1030, the execution platform 110 (e.g., compute instances or execution nodes of the client) reconstructs the rows of the read request. For example, at operation 1030 a plurality of execution nodes operate in parallel to reconstruct the rows using the snapshot and delta files. At operation 1035, the read results are provided (e.g., on a display device) or otherwise stored by the client.

Embodiments of the subject technology provide various techniques and an architecture for supporting efficient analytical query processing on fast-changing transactional data, e.g., Hybrid Transactional/Analytical Processing.

Some HTAP systems maintain a replica of columnar data and use that replica to process analytical workloads. The main drawback of this approach is that the columnar replica node is typically pre-defined, making it difficult to scale up/down based on the actual needs of analytical workloads.

Some HTAP systems instead maintain a vertical integration of row store and columnar store by storing the in-memory writes in a row store and on-disk data in a columnar store. The columnar store is further associated with indexes to support efficient point lookups for operation workloads. One potential drawback of this approach is that it sacrifices the operational workload performance as it's widely known that row stores are more suitable for operational workloads.

Embodiments of the subject technology provide an architecture for HTAP systems referred to herein as a columnar cache. At a high level, the overall architecture is that operational data is stored in FDB clusters, which seamlessly replicate them to blob storage for recovery and efficient scans. The blob replicas are key-value data as FDB is a key-value store and does not understand table schemas. To speed up analytical query processing, a columnar cache is implemented on a virtual warehouse (e.g., execution node). When an execution node executes a query that first accesses a blob file from remote storage and the blob file is not cached locally, the query (e.g., execution node executing the query) transforms the blob file into a columnar file format to speed up subsequent query processing.

Some example advantages of the subject technology at least include:
  The columnar cache is completely built on-demand, and cost(s) are determined when a user actually runs analytical queries.
  The columnar cache is implemented in virtual warehouses, which enable scaling up and scaling down based on workloads.

In an embodiment, a columnar cache is provided by an execution node to efficiently execute analytical queries on hybrid tables. Hybrid tables store data in linearizable storage (e.g., FDB), which replicates the data into blob storage as snapshots and deltas (e.g., information indicating changes in data from operation(s)). However, FDB snapshots and deltas are in the row-format, which may be slower to process for analytics. Embodiments provide an execution node columnar cache to accelerate analytical query processing by converting snapshots and deltas into columnar formats when they are accessed by an execution node for the first time.

Figure 11:
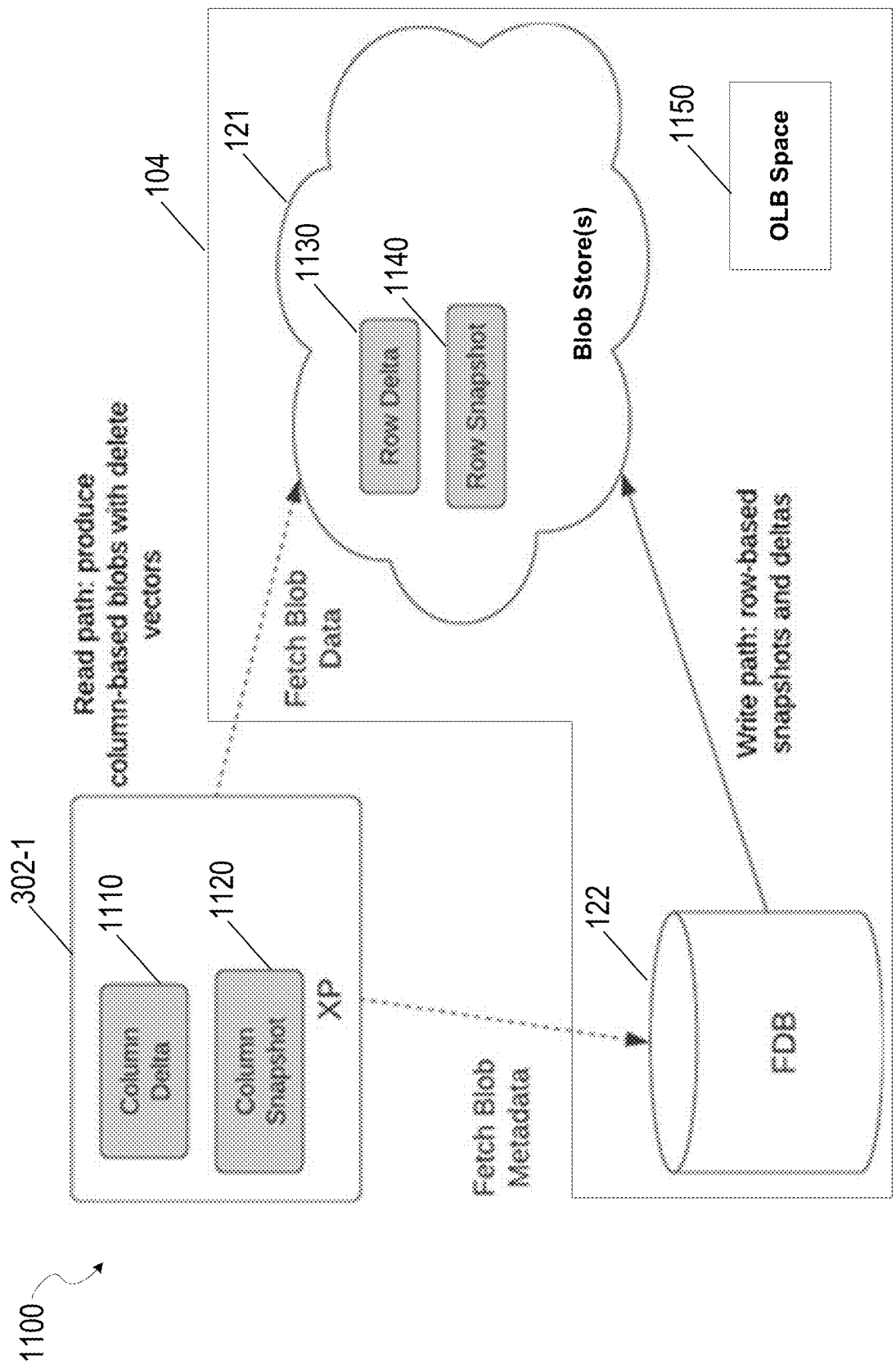
FIG. 11 illustrates an example of an architecture implementing a columnar cache within an execution node, in accordance with embodiments of the subject technology.

FIG. 11 illustrates an example of an architecture 1100 implementing a columnar cache within an execution node, in accordance with embodiments of the subject technology.

In FIG. 11, an architecture 1100 of hybrid tables with a columnar cache is shown. In a write path where a write operation is performed, FDB (e.g., key-value storage device 122) replicates the change streams to produce row-based deltas (e.g., row delta information 1130) and snapshots (row snapshot information 1140) in a blob store (e.g., data store for blob data provided by range-based blob storage device 121). Key-value storage device 122 (e.g., FDB) performs a set of operations to achieve range partitions of a key space as multiple range granules. Each range granule has a snapshot file, multiple delta files, and in-memory mutations.

In an implementation, an example configuration is a 10 MB snapshot file size, 500 KB delta file size, and maximum 10 deltas per range granule (thus on average, 5 deltas per range granule). An FDB instance can be included in a given cluster ("FDB cluster" corresponding to a distributed database deployed across several machines/servers or nodes) as mentioned below.

As discussed before, the storage platform 104 includes multiple data storage devices, including, for example, blob storage device 120 (e.g., storing data in a micro-partition format of an OLAP database), range-based blob storage device 121 (e.g., storing blob of data, each blob corresponding to a range granule), and key-value storage device 122 (e.g., storing key-value pair data of a OLTP database).

In the example of FIG. 11, execution node 302-1 includes column delta information 1110 and column snapshot information 1120, each of which may stored in memory (or local storage) of the execution node. In an implementation, storage platform 104 includes a blob store in range-based blob storage device 121. Such a blob store includes row delta information 1130 and row snapshot information 1140. Further, OLB space 1150 is provided for large values (discussed further herein), which can be implemented as a separate blob store from another blob store that includes row delta information 1130 and row snapshot information 1140 in an implementation.

To perform query processing using these blob files, an execution node (e.g., execution node 302-1) performs the following:
  1. Contact (e.g., send request, make an API call, and the like) a FDB cluster (e.g., key-value storage device 122 provided by storage platform 104) to retrieve blob metadata and a set of recent writes for a given query range
  2. In an implementation, blob metadata includes the snapshot file path, delta file paths, and in-memory mutations (if any)
  3. Following each file path from the blob metadata, if the execution node does not find either the snapshot file or delta files from its local cache, then fetch the missing file(s) (e.g., snapshot file or delta file(s)) from the blob storage, and store the columnar version in the local cache. In an implementation, the local cache refers to a cache provided by the execution node that is used to cache columnar files, and a new file type is provided to store columnar blob files in the local cache. Moreover, as discussed before, after retrieving the file(s) from blob storage, the execution node can transform the blob file transforms into a columnar file format (e.g., Parquet). The execution node merges the versions from the fetched (or cached) snapshots, deltas, and in-memory mutations to find the as-of version for each key.

As further shown, in a read path, the execution node sends a request to the blob store to read data, which produces column-based blobs using delete vectors. A delete vector can be understood as a data structure for storing a location of a previous deleted version of a row if this version was to be visible.

The following discussion relates to an open file format (e.g., Apache Parquet corresponding to a column-oriented data file format for efficient data storage and retrieval, which provides efficient data compression and encoding schemes) writer and reader.

The following discussion relates to utilizing Parquet as a columnar file format since it is relatively easy to use and also provides reasonably good performance. In an implementation, a ParquetWriter (e.g., class or object or component) is provided to write a number of rowsets into a parquet file, and a ParquetReader (e.g., class or object or component) is provided to read the specified columns from a parquet file back to rowsets.

The following are example code statements for a Parquet writer, which may be accessed via an API.

```
struct ParquetColumn{std::string name; Type;
bool nullable;
}
class ParquetWriter{
public:
void open(const FileDescriptor& path,
    const EncryptionKey* key,
    const std::vector<ParquetColumn>& schema);
void writeRowsets(const std::vector<Rowset>& rowsets,
    const std::map<std::string, std::string>& metadata);
void close( );
};
```

ParquetWriter::open( ) initializes the writer using the given path, an optionally provided encryption key, and the schema of the file.

ParquetWriter::writeRowsets( ) then takes all rowsets (managed by the caller) as input, and writes them to the Parquet file. Additionally it will save the metadata (in the form of key-value pairs) in the Parquet file, too. These rowsets must have colsets specified as the schema.

In an implementation, the write API performs the following tasks:
1. Write the rowsets and the schema metadata into a Parquet file (encrypted if the encryption key is provided).
2. Perform type derivation based on the rowsets, i.e., select the most suitable Parquet data type based on the min/max values
3. Perform the optimal encoding for each column In an example, number 3 above is only needed if numbers 1 and 2 do not provide sufficient performance to meet specific performance goals. In an implementation, Parquet column encoders are further provided to perform more advanced encoding.

The following are example code statements for a Parquet reader, which may be accessed via an API.

```
class ParquetReader{
public:
void open(const FileDescriptor& path, const EncryptionKey* key);
const std::map<std::string, ParquetColumn>& getSchema( );
const std::map<std::string, std::string>& getMetadata( );
void initRead(const std::vector<ParquetColumn>& requestedSchema);
bool getNextRowset(Rowset* rowset);
void close( );
};
```

ParquetReader provides APIs to open a Parquet file, inspect its schema, and read rowsets iteratively for a given set of columns.

ParquetReader::open( ) opens the given parquet file using the optionally provided encryption key. It serves as the entrance of the class.

ParquetReader::initRead( ) initializes the reader to scan the given set of columns.

ParquetReader::getNextRowset( ) allows the caller to iteratively read all rowsets. The input rowset must have the same schema as specified in columns. In an implementation, the function is expected to perform some type casting if necessary to fill in the rowset (e.g., upcasting or downcasting of FIXED types). The function returns true if the processing has completed and no data is returned.

The following discussion relates to query processing using the columnar cache.

When querying a key range of a table, a hybrid table scanner ("scanner" for short), provided by an execution node, first contacts FDB (e.g., provided by storage platform 104) to get the metadata of all intersecting range granules. When a blob file (snapshot or delta) is not cached locally, the scanner will fetch the file from the remote blob store (e.g., provided by storage platform 104), and convert it to a Parquet file locally. For each range granule, an example process performs is as follows:
1. read the snapshot file (either local or remote), and convert them into rowsets
2. read the delta files (either local or remote), and convert them into rowsets
3. merge the rowsets to apply FDB/OLTP (e.g., transaction manager 440) visibility rules, and select the as-of version of each key using SelectionColsets
4. for non-cached files, write their rowsets (without SelectionColsets) back to the Parquet files.

The following discussion relates to producing rowsets from blobs.

For pre-processing rows, while converting blob files into rowsets, the rows can undergo pre-processing for correctness reasons and to improve the subsequent read performance.

Remove rows from other spaces: a table may have multiple sub-spaces in FDB, e.g., for index data, undo data, and OLB data, and the like. In an implementation, all of such sub-spaces are stored or implemented using blob storage at once. As a result a single blob file may contain data from different spaces. In an example, table data in the normal space for the columnar cache is utilized, and keys that belong to other spaces are filtered out. This step can be done at the key-value pair level.

To optimize storing large values (e.g., by the transaction manager 440), an out-of-line blob (OLB) space is provided so that the transaction manager can only store the keys in a "normal" space but store the actual large values into a separate OLB key space provided by the subject system. In some example embodiments, such an OLB key space is discussed in application Ser. No. 17/555,197, titled "Optimizations To Read And Write Transactions For Large Values In Distributed Databases," filed on Dec. 17, 2021, which is hereby incorporated in its entirety.

Some rows will be invisible for all subsequent queries, and such rows can be safely removed to improve the subsequent read performance. Some examples for removing rows include:
versions written by restarted or aborted statements, or aborted transactions
lock keys (locks are always invisible to readers)

for the snapshot file, versions that have been overwritten by some version in the same snapshot file rows that FDB clears (where MVCC logic is used to determine version visibility)

Key rewriting: in an implementation, all committed versions are converted into a commitTs (e.g., commit timestamp) embedded format to improve the subsequent read performance. In an example, there may still be some versions without commitTs embedded.

For the last two steps from above, a purge/rewrite of an unrewritten (e.g., not yet rewritten) version is performed if the version is committed/aborted before the version is stored in the blob file. The reason is that the produced columnar file can be reused by concurrent queries. Further, other queries may use a different read timestamp, which means that a version is still pending, thus giving different visibility results. As a result, the last two steps are applied in the snapshot file.

The following discussion relates to an example rowset format.

In addition to all table columns defined in the table schema, the produced rowsets will have some additional metadata colsets (column sets) to help with subsequent visibility checking. These metadata colsets will also be included when written to storage.

The snapshot file contains all valid FDB versions (only sets, not clears) at a given FDB read version. However, these versions may not be visible OLTP versions (e.g., provided or generated by transaction manager 440). Thus, additional columns are included with the rowset:

delete vector column: each cell stores an optional delete pointer to the previous version deleted by this version stamp column: each cells stores the OLTP stamp for the key OLBPtr column: each cell stores a pointer to the OLB space (e.g., OLB space 1150). In an example, such a space is used for large values only (e.g., greater than a particular size threshold).

The delta file stores a list of FDB mutations that are visible at different FDB read versions. Thus, the following additional metadata columns are stored in addition to the snapshot file:

FDB op column: each cell stores the FDB operation type, i.e., set or clear

FDB commit version column: each cell stores when each version is committed

The following discussion relates to producing rowsets from cache.

If cached files were written for the same read version being read, skip further processing entirely. Emit all rows as-is.

Re-check all pending values as their corresponding TST entry might have changed at the new version:
If stamp.commit_timestamp is null, then fetch the TST to determine the status of txnid.stmtNum.restartCount.

The following discussion relates to applying visibility rules.

In an implementation, a merge-sort-based approach is provided to produce the as-of version of each key for the query. A version V is an as-of version for a query Q if one of the following holds:

1. If V is written by the current execution of Q, then V is the as-of version.
2. If V is written by a finalized statement of Q's transaction, then V is the as-of version if there exists no version written by a finalized statement of Q's transaction with a larger statement number;
3. If V is not written by Q's transaction, then V is the as-of version if V's commit timestamp <=Q's read timestamp, and there exists no version whose commit timestamp <=Q's read timestamp and >Q's read timestamp (i.e., V is the latest visible version)

The basic idea of the merge algorithm is to merge-sort the rowsets from all blob files (rowsets within each blob file are already sorted based on their user keys) to produce a sorted stream of all keys. For each user key, all versions in the snapshot file are processed, then the first delta, and finally the last delta. Throughout the iteration, the previous visible version Vprev is kept and used to compare with the current version Vcurr. This will result in a number of outcomes:

Vcurr is not visible (e.g., not committed, or commit version >read version), then simply ignore it Vprev and Vcurr do not have the same user key, then add Vprev to selection if it is not a tombstone, and set Vprev=Vcurr.

Vprev and Vcurr have the same user key, then set Vprev=Vcurr if Vcurr is "newer" than Vprev.

At the end of the processing, add Vprev to selection if it is not a tombstone.

The following relates to support for handling large values.

In an implementation, FDB has a limitation on the value size of 100 KB. To workaround this, transaction manager 440 (e.g., for OLTP transactions) implemented its own large value support by breaking down a large value into multiple FDB values and storing them into a separate OLB (out-of-line blob) space. Columnarizing (e.g., transforming and storing data into columns) these large values can be challenging because a single logical value may be stored into multiple snapshot/delta files (e.g., in an implementation, note that FDB may not guarantee that a large value cannot span multiple range granules).

In an implementation, all rows in the OLB space will be stored in the row format as is without any columnarization. For a large value, the key and the stamp is stored in the Parquet value, and let the reader (e.g., execution node performing a read operation from a given query) follow the pointer to do another hybrid read in the OLB space to fetch the large value.

Note that since the table space is blobbified all at once, this could mean that the same blob file may contain both the normal space and the OLB space. Thus, the same blob file may be cached twice, where its normal space portion is cached in the parquet format and its OLB space portion is cached in the original row format. Separate file formats for cached files therefore are utilized. In an implementation, Parquet files will have the .parquet suffix while blob files will have .snapshot/.delta suffix, even though they all correspond to the same remote file.

The following discussion relates to producing Parquet files.

At the end of the processing, the rowsets are written to storage as Parquet files, and may be performed irrespective of status in the selection vector. These rowsets will have the same format as the rowsets for in-memory processing described in the previous discussion of the rowset format.

The following discussion relates to encryption support.

In an implementation, the cached parquet files will be encrypted, consistent with a FDN file cache (e.g., columnar file cache). A same encryption key is utilized as the key that FDB uses to encrypt the blob files to encrypt the cached parquet files. When receiving the file pointers for snapshot and delta files, FDB will provide the encryption keys as well, which can be used to encrypt the parquet files.

Moreover, in an implementation, key rotation will be handled by FDB as well. When key rotation is needed, FDB will re-snapshot the range granules to produce a new snapshot file using the new encryption key. After that the columnar cache will simply produce a new cached version of the blob file using the new encryption key.

Figure 12:
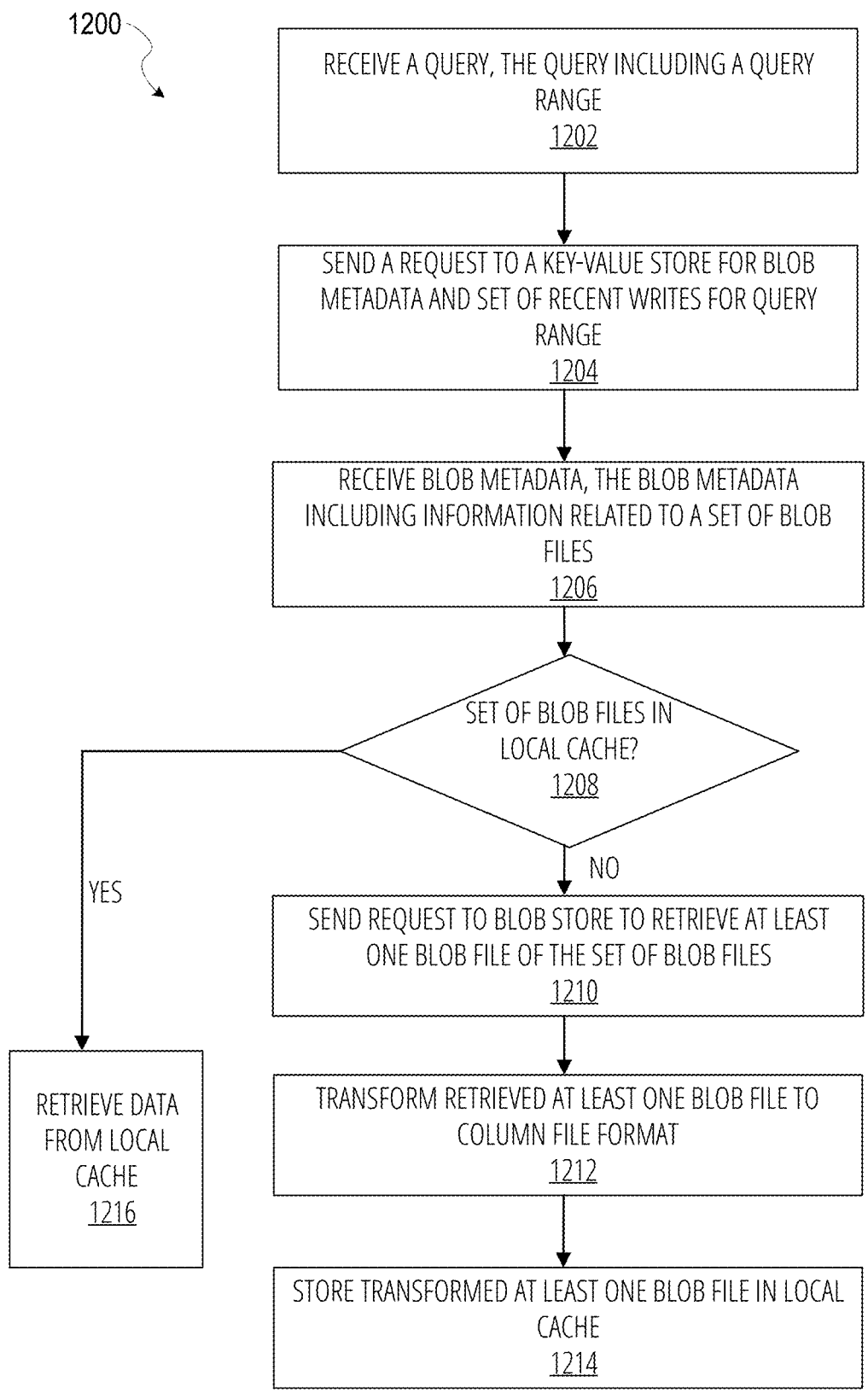
FIG. 12 is a flow diagram illustrating operations of a database system in performing a method, in accordance with some embodiments of the present disclosure.

FIG. 12 is a flow diagram illustrating operations of a database system in performing a method, in accordance with some embodiments of the present disclosure. The method 1200 may be embodied in computer-readable instructions for execution by one or more hardware components (e.g., one or more processors) such that the operations of the method 1200 may be performed by components of network-based database system 102, such as components of the compute service manager 108 or a node in the execution platform 110. Accordingly, the method 1200 is described below, by way of example with reference thereto. However, it shall be appreciated that the method 1200 may be deployed on various other hardware configurations and is not intended to be limited to deployment within the network-based database system 102.

At operation 1202, the execution node 302-1 receives a query, the query including a query range for processing the query.

At operation 1204, the execution node 302-1 sends a request to a key-value store for blob metadata and a set of recent writes for the query range.

At operation 1206, the execution node 302-1 receives the blob metadata, the blob metadata including information related to a set of blob files.

At operation 1208, the execution node 302-1 determines whether the set of blob files is stored in a local cache.

At operation 1210, when the execution node 302-1 determines that the set of blob files are not in local cache, such as in response to at least one blob file being missing from the set of blob files, the execution node 302-1 sends a request to a blob store to retrieve the at least one blob file of the set of blob files.

At operation 1212, the execution node 302-1 transforms the retrieved at least one blob file to a column file format.

At operation 1214, the execution node 302-1 stores the transformed at least one blob file in the local cache.

At operation 1216, when the execution node 302-1 determines that the set of blob files are stored in local cache, the execution node 302-1 retrieves data from the local cache.

In an embodiment, the execution node 302-1 merges the transformed at least one blob file based at least in part on a set of visibility rules, the set of visibility rules determining an as-of version of each key of the query.

In an embodiment, determining the as-of version of each key comprises: determining that a version of a particular key was written by a current execution of the query.

In an embodiment, determining the as-of version of each key comprises: determining that a version of a particular key was written by a finalized statement of a transaction associated with the query; and determining that no other version of the particular key was written by a finalized statement of the transaction associated with the query with a larger statement number.

In an embodiment, determining the as-of version of each key comprises: determining that a version of a particular key was not written by a transaction associated with the query; determining that a commit timestamp of the version of the particular key is less than or equal to a read timestamp of the query; and determining that no version of the particular key has a commit timestamp that is less than or equal to the read timestamp of the query and greater than the read timestamp of the query.

Figure 13:
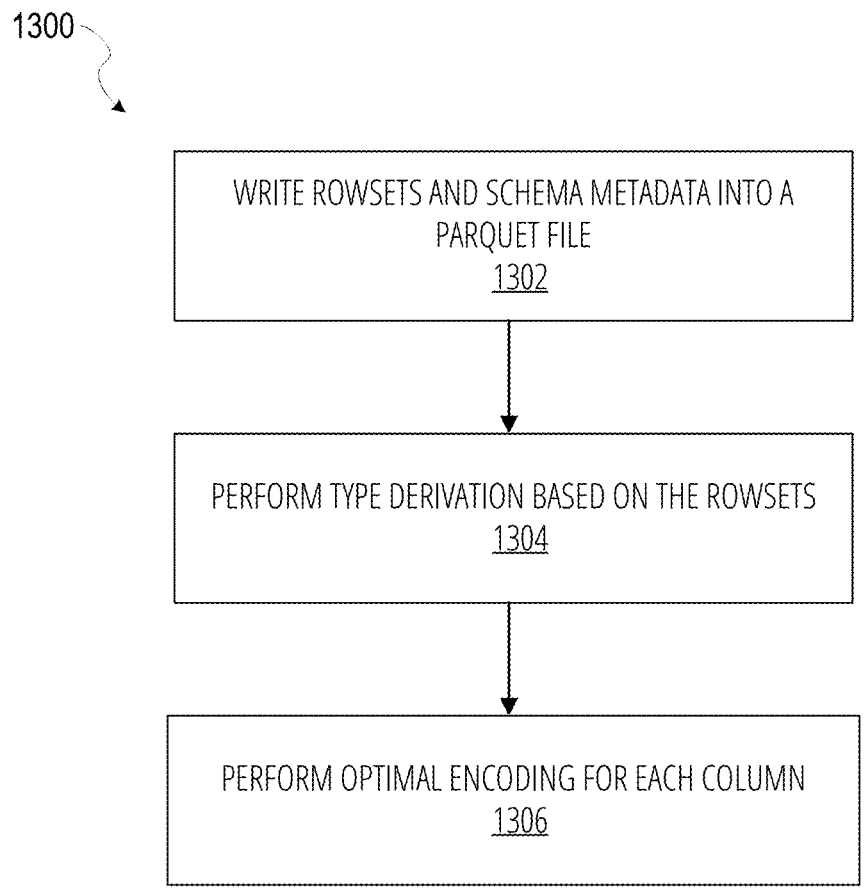
FIG. 13 is a flow diagram illustrating operations of a database system in performing a method, in accordance with some embodiments of the present disclosure.

FIG. 13 is a flow diagram illustrating operations of a database system in performing a method, in accordance with some embodiments of the present disclosure. The method 1300 may be embodied in computer-readable instructions for execution by one or more hardware components (e.g., one or more processors) such that the operations of the method 1300 may be performed by components of network-based database system 102, such as components of the compute service manager 108 or a node in the execution platform 110. Accordingly, the method 1300 is described below, by way of example with reference thereto. However, it shall be appreciated that the method 1300 may be deployed on various other hardware configurations and is not intended to be limited to deployment within the network-based database system 102.

At operation 1302, the execution node 302-1 writes rowsets and schema metadata into a Parquet file.

At operation 1304, the execution node 302-1 performs type derivation based on the rowsets.

At operation 1306, the execution node 302-1 performs encoding for each column of data of the Parquet file.

Figure 14:
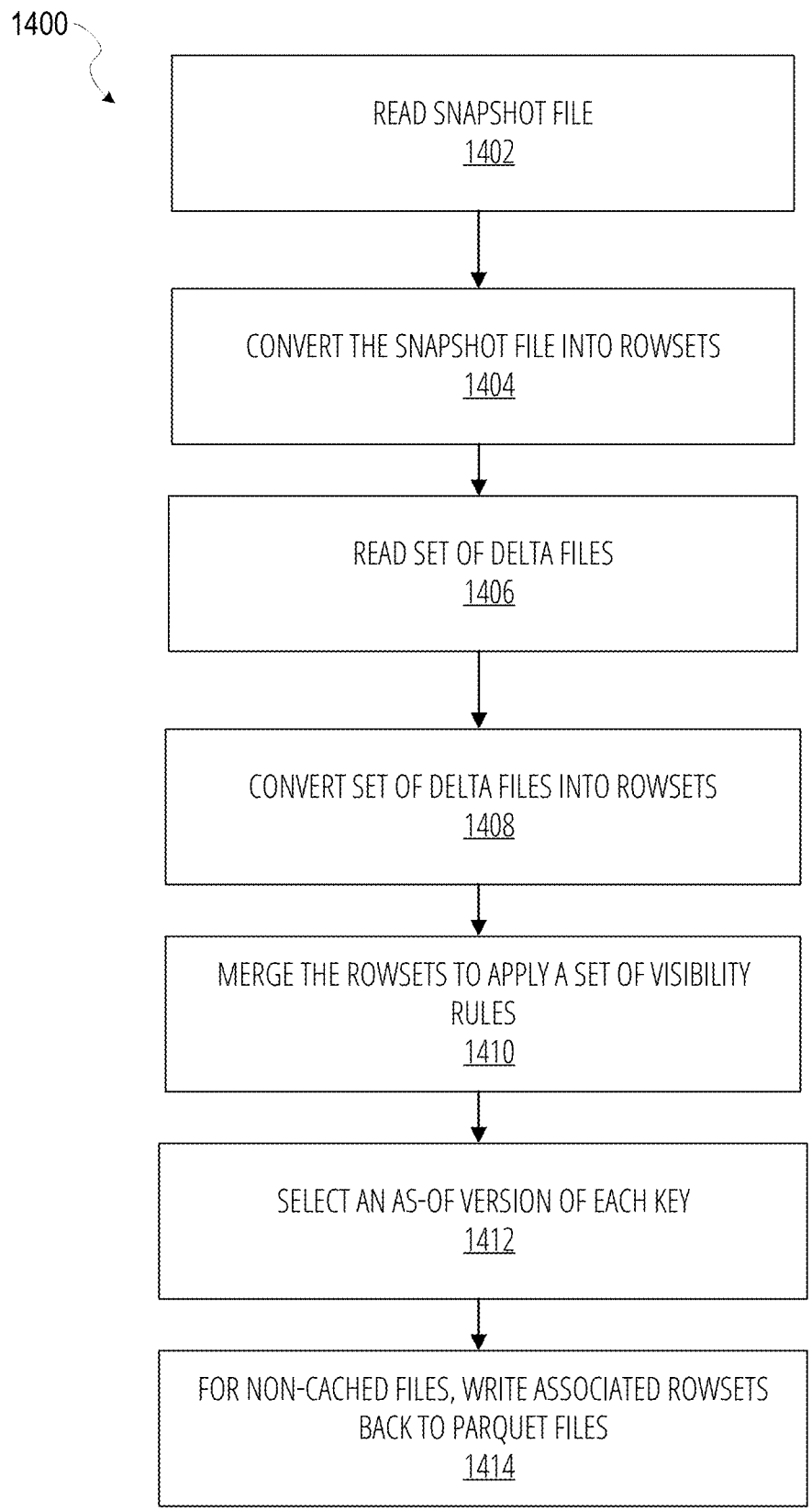
FIG. 14 is a flow diagram illustrating operations of a database system in performing a method, in accordance with some embodiments of the present disclosure.

FIG. 14 is a flow diagram illustrating operations of a database system in performing a method, in accordance with some embodiments of the present disclosure. The method 1400 may be embodied in computer-readable instructions for execution by one or more hardware components (e.g., one or more processors) such that the operations of the method 1400 may be performed by components of network-based database system 102, such as components of the compute service manager 108 or a node in the execution platform 110. Accordingly, the method 1400 is described below, by way of example with reference thereto. However, it shall be appreciated that the method 1400 may be deployed on various other hardware configurations and is not intended to be limited to deployment within the network-based database system 102.

At operation 1402, the execution node 302-1 reads a snapshot file

Figure 15:
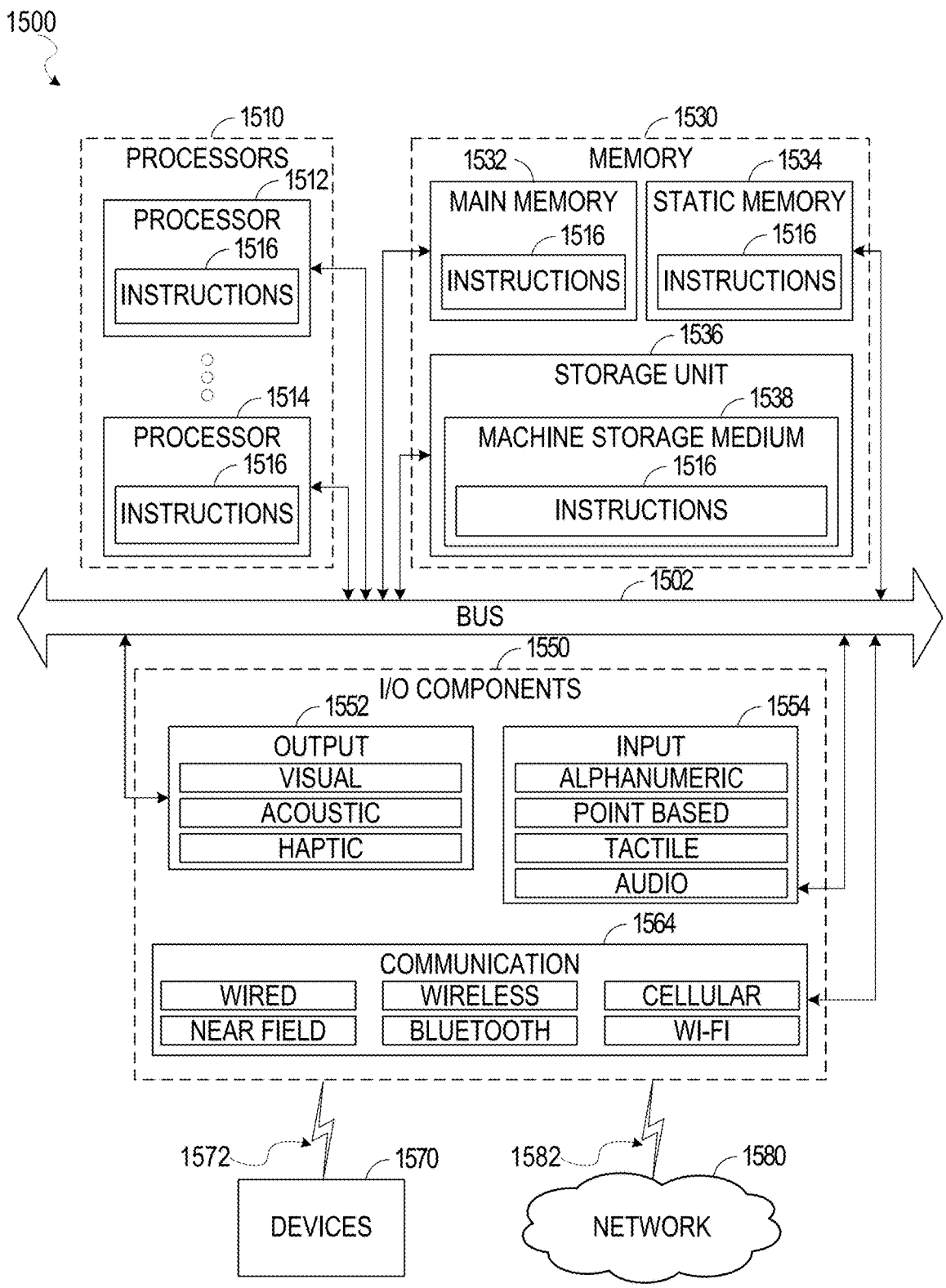
FIG. 15 illustrates a diagrammatic representation of a machine in the form of a computer system within which a set of instructions may be executed for causing the machine to perform any one or more of the methodologies discussed herein, in accordance with some embodiments of the present disclosure.

At operation 1404, the execution node 302-1 converts the snapshot file into rowsets At operation 1406, the execution node 302-1 reads a set of delta files At operation 1408, the execution node 302-1 converts the set of delta files into particular rowsets At operation 1410, the execution node 302-1 merges the particular rowsets to apply a set of visibility rules At operation 1412, the execution node 302-1 selects an as-of version of each key At operation 1414, the execution node 302-1 for non-cached files, writes associated rowsets back to a set of Parquet files FIG. 15 illustrates a diagrammatic representation of a machine 1500 in the form of a computer system within which a set of instructions may be executed for causing the machine 1500 to perform any one or more of the methodologies discussed herein, according to an example embodiment. Specifically, FIG. 15 shows a diagrammatic representation of the machine 1500 in the example form of a computer system, within which instructions 1516 (e.g., software, a program, an application, an applet, an app, or other executable code) for causing the machine 1500 to perform any one or more of the methodologies discussed herein may be executed. For example, the instructions 1516 may cause the machine 1500 to execute any one or more operations of method 1000. As another example, the instructions 1516 may cause the machine 1500 to implement portions of the data flows illustrated in at least FIG. 10. In this way, the instructions 1516 transform a general, non-programmed machine into a particular machine 1500 (e.g., the compute service manager 108 or a node in the execution platform 110) that is specially configured to carry out any one of the described and illustrated functions in the manner described herein.

In alternative embodiments, the machine 1500 operates as a standalone device or may be coupled (e.g., networked) to other machines. In a networked deployment, the machine 1500 may operate in the capacity of a server machine or a client machine in a server-client network environment, or as a peer machine in a peer-to-peer (or distributed) network environment. The machine 1500 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 1516, sequentially or otherwise, that specify actions to be taken by the machine 1500. Further, while only a single machine 1500 is illustrated, the term "machine" shall also be taken to include a collection of machines 1500 that individually or jointly execute the instructions 1516 to perform any one or more of the methodologies discussed herein.

The machine 1500 includes processors 1510, memory 1530, and input/output (I/O) components 1550 configured to communicate with each other such as via a bus 1502. In an example embodiment, the processors 1510 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1512 and a processor 1514 that may execute the instructions 1516. The term "processor" is intended to include multi-core processors 1510 that may comprise two or more independent processors (sometimes referred to as "cores") that may execute instructions 1516 contemporaneously. Although FIG. 15 shows multiple processors 1510, the machine 1500 may include a single processor with a single core, a single processor with multiple cores (e.g., a multi-core processor), multiple processors with a single core, multiple processors with multiple cores, or any combination thereof.

The memory 1530 may include a main memory 1532, a static memory 1534, and a storage unit 1536, all accessible to the processors 1510 such as via the bus 1502. The main memory 1532, the static memory 1534, and the storage unit 1536 store the instructions 1516 embodying any one or more of the methodologies or functions described herein. The instructions 1516 may also reside, completely or partially, within the main memory 1532, within the static memory 1534, within machine storage medium 1538 of the storage unit 1536, within at least one of the processors 1510 (e.g., within the processor's cache memory), or any suitable combination thereof, during execution thereof by the machine 1500.

The I/O components 1550 include components to receive input, provide output, produce output, transmit information, exchange information, capture measurements, and so on. The specific I/O components 1550 that are included in a particular machine 1500 will depend on the type of machine. For example, portable machines such as mobile phones will likely include a touch input device or other such input mechanisms, while a headless server machine will likely not include such a touch input device. It will be appreciated that the I/O components 1550 may include many other components that are not shown in FIG. 15. The I/O components 1550 are grouped according to functionality merely for simplifying the following discussion and the grouping is in no way limiting. In various example embodiments, the I/O components 1550 may include output components 1552 and input components 1554. The output components 1552 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 1554 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 1550 may include communication components 1564 operable to couple the machine 1500 to a network 1580 or devices 1570 via a coupling 1582 and a coupling 1572, respectively. For example, the communication components 1564 may include a network interface component or another suitable device to interface with the network 1580. In further examples, the communication components 1564 may include wired communication components, wireless communication components, cellular communication components, and other communication components to provide communication via other modalities. The devices 1570 may be another machine or any of a wide variety of peripheral devices (e.g., a peripheral device coupled via a universal serial bus (USB)). For example, as noted above, the machine 1500 may correspond to any one of the compute service manager 108 or the execution platform 110, and the devices 1570 may include the client device 104 or any other computing device described herein as being in communication with the network-based database system 102 or the cloud storage platform 104.

The various memories (e.g., 1530, 1532, 1534, and/or memory of the processor(s) 1510 and/or the storage unit 1536) may store one or more sets of instructions 1516 and data structures (e.g., software) embodying or utilized by any one or more of the methodologies or functions described herein. These instructions 1516, when executed by the processor(s) 1510, cause various operations to implement the disclosed embodiments.

As used herein, the terms "machine-storage medium," "device-storage medium," and "computer-storage medium" mean the same thing and may be used interchangeably in this disclosure. The terms refer to a single or multiple non-transitory storage devices and/or non-transitory media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include nonvolatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 1580 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 1580 or a portion of the network 1580 may include a wireless or cellular network, and the coupling 1582 may be a Code Division Multiple Access (CDMA) connection, a Global System for Mobile communications (GSM) connection, or another type of cellular or wireless coupling. In this example, the coupling 1582 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 1516 may be transmitted or received over the network 1580 using a transmission medium via a network interface device (e.g., a network interface component included in the communication components 1564) and utilizing any one of a number of well-known transfer protocols (e.g., hypertext transfer protocol (HTTP)). Similarly, the instructions 1516 may be transmitted or received using a transmission medium via the coupling 1572 (e.g., a peer-to-peer coupling) to the devices 1570. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1516 for execution by the machine 1500, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the method 500 may be performed by one or more processors. The performance of certain of the operations may be distributed among the one or more processors, not only residing within a single machine, but also deployed across a number of machines. In some example embodiments, the processor or processors may be located in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A system comprising:
   at least one hardware processor; and
   a memory storing instructions that cause the at least one hardware processor to perform operations comprising:
   receiving a query, the query including a query range for processing the query;
   sending, by an execution node that received the query, a request to a key-value store for blob metadata and a set of recent writes for the query range, the key-value store storing the blob metadata in a different location than a local cache, the local cache being included in memory of the execution node;
   receiving the blob metadata, the blob metadata including information related to a set of blob files;
   determining, by the execution node using the blob metadata, whether a copy of each of the set of blob files is stored in the local cache included in memory of the execution node;
   in response to at least one blob file being missing from the set of blob files, sending a request to a blob store to retrieve, from the blob store, the at least one blob file of the set of blob files;
   transforming the retrieved at least one blob file to a second file in a column file format, the at least one blob file being in a first format that is different than the column file format, the transforming comprising at least converting a particular snapshot file from the at least one blob file to a particular set of rowsets and writing the set of rowsets into the second file in the column file format; and
   storing the second file in the local cache.

2. The system of claim 1, wherein the blob metadata includes a snapshot file path, delta file paths, and in-memory mutations,
   wherein the copy of each of the set of blob files includes a snapshot file, the snapshot file comprises key-value pairs of a specific key-value storage device version,
   wherein determining whether the copy of each of the set of blob files is stored in the local cache is based on finding the snapshot file in the local cache, and the operations further comprise:
   merging the transformed at least one blob file based at least in part on a set of visibility rules, the set of visibility rules determining an as-of version of each key of the query.

3. The system of claim 2, wherein determining the as-of version of each key comprises:
   determining that a version of a particular key was written by a current execution of the query.

4. The system of claim 2, wherein determining the as-of version of each key comprises:
   determining that a version of a particular key was written by a finalized statement of a transaction associated with the query; and
   determining that no other version of the particular key was written by a finalized statement of the transaction associated with the query with a larger statement number.

5. The system of claim 2, wherein determining the as-of version of each key comprises:
   determining that a version of a particular key was not written by a transaction associated with the query;
   determining that a commit timestamp of the version of the particular key is less than or equal to a read timestamp of the query; and
   determining that no version of the particular key has a commit timestamp that is less than or equal to the read timestamp of the query and greater than the read timestamp of the query.

6. The system of claim 1, wherein the blob metadata comprises a snapshot file path, a set of delta file paths, and a set of in-memory mutations.

7. The system of claim 1, wherein each rowset comprises a set of columns, the set of columns comprises a delete vector column, a stamp column, and a column comprising a pointer to a separate storage space, the separate store space storing a set of values greater than a particular size threshold.

8. The system of claim 1, wherein the key-value store comprises a distributed database that provides linearizable storage.

9. The system of claim 1, wherein the operations further comprise:
   writing rowsets and schema metadata into a Parquet file;
   performing type derivation based on the rowsets; and
   performing encoding for each column of data of the Parquet file.

10. The system of claim 1, wherein the operations further comprise:
    reading a snapshot file;
    converting the snapshot file into rowsets;
    reading a set of delta files;
    converting the set of delta files into particular rowsets;
    merging the particular rowsets to apply a set of visibility rules;
    selecting an as-of version of each key; and
    for non-cached files, writing associated rowsets back to a set of Parquet files.

11. A method comprising:
    receiving a query, the query including a query range for processing the query;
    sending, by an execution node that received the query, a request to a key-value store for blob metadata and a set of recent writes for the query range, the key-value store storing the blob metadata in a different location than a local cache, the local cache being included in memory of the execution node;
    receiving the blob metadata, the blob metadata including information related to a set of blob files;
    determining, by the execution node using the blob metadata, whether a copy of each of the set of blob files is stored in the local cache included in memory of the execution node;
    in response to at least one blob file being missing from the set of blob files, sending a request to a blob store to retrieve, from the blob store, the at least one blob file of the set of blob files;
    transforming the retrieved at least one blob file to a second file in a column file format, the at least one blob file being in a first format that is different than the column file format, the transforming comprising at least converting a particular snapshot file from the at least one blob file to a particular set of rowsets and writing the set of rowsets into the second file in the column file format; and
    storing the second file in the local cache.

12. The method of claim 11, further comprising:
merging the transformed at least one blob file based at least in part on a set of visibility rules, the set of visibility rules determining an as-of version of each key of the query.

13. The method of claim 12, wherein determining the as-of version of each key comprises:
determining that a version of a particular key was written by a current execution of the query.

14. The method of claim 12, wherein determining the as-of version of each key comprises:
determining that a version of a particular key was written by a finalized statement of a transaction associated with the query; and
determining that no other version of the particular key was written by a finalized statement of the transaction associated with the query with a larger statement number.

15. The method of claim 12, wherein determining the as-of version of each key comprises:
determining that a version of a particular key was not written by a transaction associated with the query;
determining that a commit timestamp of the version of the particular key is less than or equal to a read timestamp of the query; and
determining that no version of the particular key has a commit timestamp that is less than or equal to the read timestamp of the query and greater than the read timestamp of the query.

16. The method of claim 11, wherein the blob metadata comprises a snapshot file path, a set of delta file paths, and a set of in-memory mutations.

17. The method of claim 11, wherein the local cache is provided by an execution node.

18. The method of claim 11, wherein the key-value store comprises a distributed database that provides linearizable storage.

19. The method of claim 11, further comprising:
writing rowsets and schema metadata into a Parquet file;
performing type derivation based on the rowsets; and
performing encoding for each column of data of the Parquet file.

20. A non-transitory computer-storage medium comprising instructions that, when executed by one or more processors of a machine, configure the machine to perform operations comprising:
receiving a query, the query including a query range for processing the query;
sending, by an execution node that received the query, a request to a key-value store for blob metadata and a set of recent writes for the query range, the key-value store storing the blob metadata in a different location than a local cache, the local cache being included in memory of the execution node;
receiving the blob metadata, the blob metadata including information related to a set of blob files;
determining, by the execution node using the blob metadata, whether a copy of each of the set of blob files is stored in the local cache included in memory of the execution node;
in response to at least one blob file being missing from the set of blob files, sending a request to a blob store to retrieve, from the blob store, the at least one blob file of the set of blob files;
transforming the retrieved at least one blob file to a second file in a column file format, the at least one blob file being in a first format that is different than the column file format, the transforming comprising at least converting a particular snapshot file from the at least one blob file to a particular set of rowsets and writing the set of rowsets into the second file in the column file format; and
storing the second file in the local cache.

* * * * *